(12) United States Patent
Tada et al.

(10) Patent No.: US 12,728,515 B2
(45) Date of Patent: Sep. 8, 2026

(54) POWER TOOL HAVING A HAMMER MECHANISM

(71) Applicant: MAKITA CORPORATION, Anjo (JP)

(72) Inventors: Yoshiro Tada, Anjo (JP); Masanori Furusawa, Anjo (JP); Kanami Inagaki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/978,890

(22) Filed: Dec. 12, 2024

(65) Prior Publication Data

US 2025/0214218 A1 Jul. 3, 2025

(30) Foreign Application Priority Data

Dec. 27, 2023 (JP) ................................ 2023-221542

(51) Int. Cl.
*B25D 17/24* (2006.01)
*A01B 1/02* (2006.01)
*B25D 17/04* (2006.01)

(52) U.S. Cl.
CPC ............ *B25D 17/245* (2013.01); *A01B 1/022* (2013.01); *B25D 17/04* (2013.01); *B25D 2250/095* (2013.01); *B25D 2250/375* (2013.01)

(58) Field of Classification Search
CPC .. B25D 17/04; B25D 17/28; B25D 2250/095; B25D 2250/375; B25F 5/02; A01B 1/022
See application file for complete search history.

(56) References Cited

U.S. PATENT DOCUMENTS 4,593,466 A * 6/1986 O'Brien .................. B26B 7/005 30/296.1
4,779,687 A * 10/1988 Schreiber .............. B23B 45/006 173/171
5,813,805 A * 9/1998 Kopras ................... B25F 5/029 409/181
5,902,080 A * 5/1999 Kopras ..................... B25F 5/02 30/DIG. 1
6,935,438 B2 * 8/2005 Hofmann .............. B24B 23/028 173/217

(Continued)

FOREIGN PATENT DOCUMENTS

WO WO-2009049954 A1 * 4/2009 ........... B25D 17/088
WO WO-2009083317 A1 * 7/2009 ................ B25F 5/02
WO 2023/025719 A1 3/2023

*Primary Examiner* — Shelley M Self
*Assistant Examiner* — David G Shutty
(74) *Attorney, Agent, or Firm* — Oliff PLC

(57) ABSTRACT

A power tool includes a motor, a hammer mechanism, a housing, and a handle. The motor has a motor shaft that rotates around a motor axis. The hammer mechanism includes a cylinder and a hammer element and is configured to convert rotary motion of the motor shaft to linear motion of the hammer element along a prescribed hammer axis by utilizing action of an air spring of an air chamber. The housing has a front end part including a front end surface to which a tool accessory is mounted, and a rear end part including a rear surface on the opposite side to the front end surface The handle is configured to be held by a user. The motor axis and the hammer axis are parallel to each other. The rear end of the handle is arranged on the rear end part.

20 Claims, 11 Drawing Sheets

(56) References Cited

U.S. PATENT DOCUMENTS

| | | | | |
|---|---|---|---|---|
| D610,427 | S * | 2/2010 | Meyerspeer | D8/69 |
| 8,230,945 | B2 * | 7/2012 | Bernhardt | F16C 35/02<br>173/171 |
| 9,149,925 | B1 * | 10/2015 | Van Valin | A01D 9/00 |
| 9,505,120 | B2 * | 11/2016 | Aoki | B25F 5/006 |
| 9,701,007 | B2 * | 7/2017 | Holubarsch | B25F 5/02 |
| 10,179,400 | B2 * | 1/2019 | Furusawa | B25F 5/026 |
| 10,328,560 | B2 * | 6/2019 | Romagnoli | B23D 51/16 |
| 10,507,590 | B2 * | 12/2019 | Skinner | B26D 5/086 |
| 11,794,326 | B2 * | 10/2023 | Dennis | B25F 5/02 |
| 11,931,878 | B2 * | 3/2024 | Swaminathan | B25F 5/026 |
| 12,005,557 | B2 * | 6/2024 | Thorson | B25D 17/06 |
| 2002/0134563 | A1 * | 9/2002 | Stirm | B25D 16/006<br>173/109 |
| 2010/0095537 | A1 * | 4/2010 | Serdynski | B23D 51/01<br>30/392 |
| 2011/0011608 | A1 * | 1/2011 | Saur | B25D 11/062<br>173/162.2 |
| 2012/0037386 | A1 * | 2/2012 | Cook | B25F 5/021<br>173/30 |
| 2015/0298309 | A1 * | 10/2015 | Berdin | B25D 9/10<br>173/104 |
| 2024/0238950 | A1 * | 7/2024 | Suzuki | B25F 5/006 |
| 2024/0326205 | A1 * | 10/2024 | Kinoshita | B25B 23/0035 |
| 2024/0359304 | A1 * | 10/2024 | Fisher | B25D 11/08 |
| 2025/0001574 | A1 * | 1/2025 | Wolf | B25F 5/02 |

* cited by examiner

TT
TX
FRONT
RIGHT
UP
DOWN
LEFT
REAR
612
61
64
80
72
70
63
60
77
62
36
76
74
70B
34
30
32
622
100
DB

100
TT
TX
612
61
90
70F
80
SX
72
52
50
54
63
GD
77
64
76BF
78
24
22
DM
20
74
70
62,624
76
FRONT
UP
DOWN
REAR
70B
DB
MX
622
30

100
TT
TX
612F
612B
612
92
90
UT
61
FRONT
UP
DOWN
REAR
526
584
72,70
58
522
SX
568
63
56
544
582
524
566
SP
562
564
546R
546
546S
520
52
546A
542
50
54
541
543
64
20
24
624,62
22
MX 100
612
61
HT1
70F
80
72
GD
63
64
77
76BF
76F
76B
60
L1
L2
HT2
624
74
L4
62
70
76
622
70B, 76BB
36T
36
30
UP
DOWN
FRONT
REAR

POWER TOOL HAVING A HAMMER MECHANISM

CROSS-REFERENCE TO RELATED APPLICATION

This application claims priority to Japanese patent application no. 2023-221542 filed on Dec. 27, 2023, the contents of which are fully incorporated herein by reference.

TECHNICAL FIELD

The present disclosure relates to a power tool having a hammer mechanism.

BACKGROUND

A power tool, having a motor that is driven by power supply from a battery, a cam coupled to a motor shaft, and a tool accessory coupled to the cam, is known. For example, WO 2023/025719 discloses a power tool that is configured to rotate the cam by utilizing the driving force of the motor and convert rotary motion of the cam to reciprocating motion of the tool accessory.

SUMMARY

In the above-described power tool such a prior art, however, the driving force of the motor is mechanically converted into reciprocating motion of the tool accessory. Therefore, vibration of the power tool may be increased, and a sufficient hammering force of the tool accessory may not be obtained.

According to one non-limiting aspect of the present disclosure, a power tool is provided. The power tool includes a motor having a motor shaft that rotates around a motor axis; a hammer mechanism that includes a cylinder and a hammer element adjacent to an air chamber defined within the cylinder and converts rotary motion of the motor shaft to linear motion of the hammer element along a hammer axis by utilizing action of an air spring of the air chamber; a housing that (i) has a front end part including a front end surface and to which a tool accessory is mounted, and a rear end part including a rear surface on the opposite side to the front end surface, and (ii) houses the motor and the hammer mechanism; and a handle that is configured to be held by a user. The motor axis and the hammer axis are parallel to each other. The rear end of the handle is arranged on the rear end part of the housing.

According to the above-described aspect, by the hammer mechanism utilizing an air spring, vibration of the power tool is reduced and large kinetic energy is transmitted to the tool accessory, compared with a hammer mechanism that mechanically transmits the kinetic energy. Further, with the arrangement of the handle on the rear end part of the housing, a user can easily apply a force of pressing the tool accessory onto a work object along the hammer axis, so that the power tool is provided that can provide a large hammering force by the tool accessory.

DETAILED DESCRIPTION OF THE EMBODIMENTS

Figure 1:
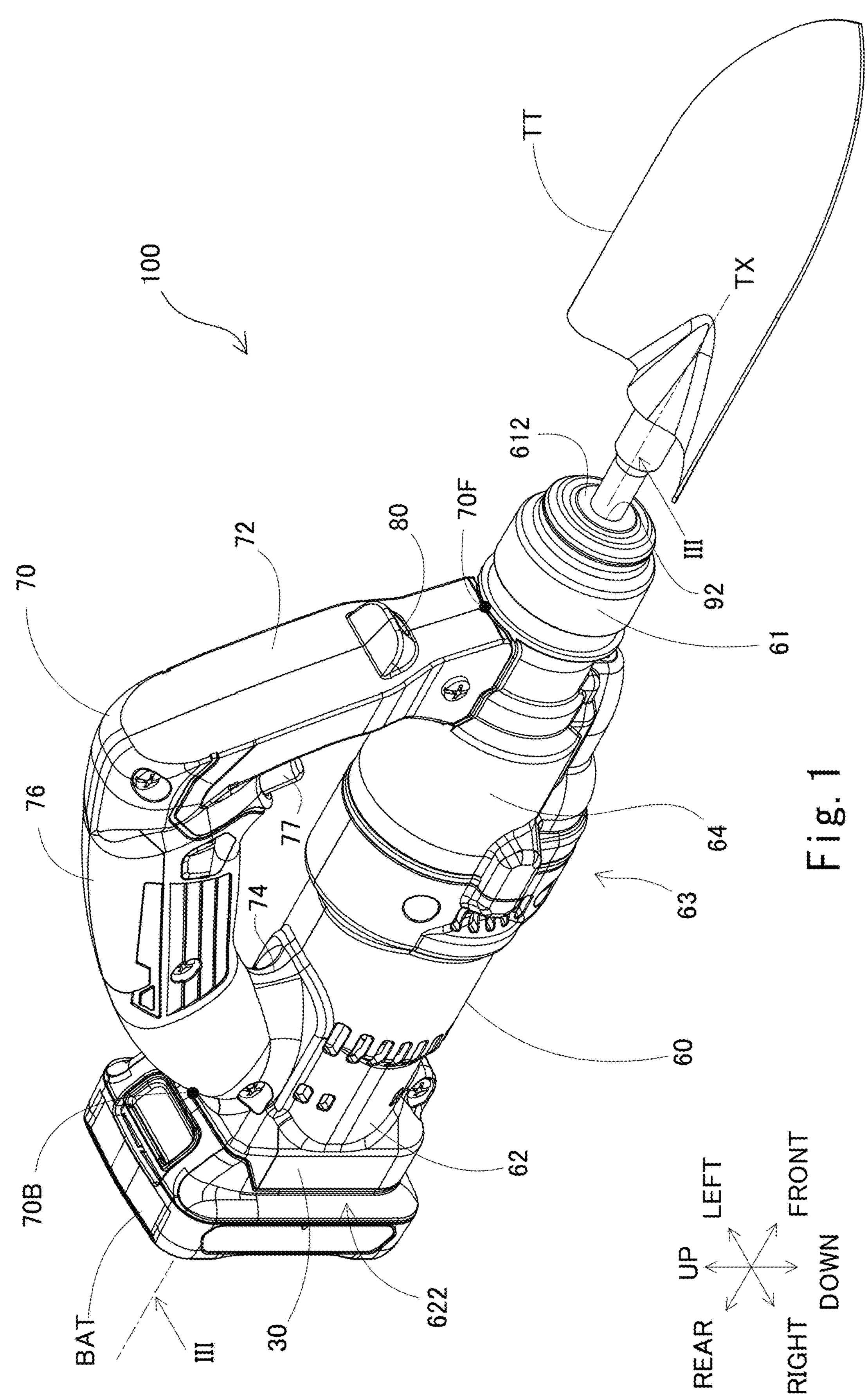
FIG. 1 shows an external appearance of an electric shovel according to a first embodiment according to the present disclosure.

Representative, non-limiting examples of the present invention are described in detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved tools and manufacturing and using methods of the tools.

Moreover, combinations of features and steps disclosed within the following detailed description may not be necessary to practice the invention in the broadest sense, and are instead taught merely to particularly describe representative examples of the invention. Furthermore, various features of the representative examples described above and below, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In addition or in the alternative to the preceding embodiment (in one or more non-limiting embodiments) according to the present disclosure, the rear end part of the housing may include a motor housing houses the motor.

In the power tool according to this embodiment, with the arrangement of the motor in the rear end part of the housing, the housing can be reduced in size in a direction crossing the hammer axis of the housing.

In addition or in the alternative to the preceding embodiments, the power tool may further have a battery mounting part configured such that a battery for supplying power to the motor can be removably attached thereto. The hammer axis may pass through the battery mounting part.

In the power tool according to this embodiment, the housing can be reduced in size in a direction crossing the hammer axis, compared with a structure in which the battery mounting part is arranged on a side surface of the housing.

In addition or in the alternative to the preceding embodiments, the hammer axis may pass through the motor.

In the power tool according to this embodiment, the housing can be reduced in size in a direction crossing the hammer axis.

In addition or in the alternative to the preceding embodiments, the hammer mechanism may include a motion converting part that converts rotary motion of the motor shaft into linear motion of the hammer element. The handle may be connected to a side surface of the housing. The handle may be arranged on the opposite side to the motion converting part across the hammer axis.

In the power tool according to this embodiment, the handle is arranged in the vicinity of the hammer axis, so that a user can easily press the handle forward while holding the handle. Thus, the user can easily press the tool accessory against a work object.

In addition or in the alternative to the preceding embodiments, at least a part of the handle overlaps at least a part of the hammer mechanism when the power tool is viewed from above in a direction orthogonal to the motor axis and passing through the handle and the hammer mechanism.

In the power tool according to this embodiment, the handle is arranged right above the hammer mechanism that tends to be heavy, so that a user can easily keep the balance of the power tool. Thus, the power tool is provided with preferrable operability for a user.

In addition or in the alternative to the preceding embodiments, the handle may include (i) a rear connection part that connects the rear end of the handle to the rear end part of the housing, (ii) a front connection part that connects a front end of the handle to a side surface of the housing, and (iii) a grip part that connects the rear connection part and the front connection part.

In the power tool according to this embodiment, the handle and the housing together form an annular configuration, so that the power tool is provided with preferred operability for a user.

In addition or in the alternative to the preceding embodiments, the grip part may be inclined relative to the hammer axis from the rear end part toward the front end surface in a direction away from the hammer axis.

According to this embodiment, the power tool is provided that is easy to lift and in which the tool accessory can be easily pressed forward by user's operation of the handle.

In addition or in the alternative to the preceding embodiments, the length of the grip part along the hammer axis may be a half or more of the length of the housing between the front end surface and the rear surface.

According to this embodiment, the power tool is provided the balance of which can be easily kept by a user. Thus, the power tool is provided with preferred operability for a user.

In addition or in the alternative to the preceding embodiments, the handle may include a connection part that connects the rear end of the handle to the rear end part of the housing, and a grip part that extends from the connection part in an extending direction crossing the hammer axis. The extending direction may have a first direction component in a direction orthogonal to the hammer axis and a second direction component in a direction along the hammer axis, and the first direction component may be greater than the second direction component.

According to this embodiment, the power tool is provided with the handle that can be easily pressed from the rear side while being held by a user. Thus, the power tool is provided with high workability.

In addition or in the alternative to the preceding embodiments, a front end of the handle may be spaced apart from the housing. The grip part may have a protruding part protruding from the grip part in a protruding direction crossing the extending direction.

According to this embodiment, the power tool is provided with the protruding part that can be supported by a user holding the grip part. Thus, the power tool is provided with preferred operability for a user.

In addition or in the alternative to the preceding embodiments, the power tool may further have a battery mounting part that is provided on the rear end part of the housing and configured such that a battery for supplying power to the motor is removably attachable thereto. An attaching/detaching direction of the battery to/from the battery mounting part may cross the hammer axis and pass through the handle.

According to this embodiment, the power tool is provided such that a user can easily attach and detach the battery by one hand, while holding the handle by the other hand.

In addition or in the alternative to the preceding embodiments, the power tool may further have a light emitting part that is configured to emit light toward a working area.

According to this embodiment, the power tool is provided that can illuminate the tool accessory, the work object or its surroundings, and thus improve the visibility of a working area of the power tool.

A. First Embodiment

A power tool 100 having a hammer mechanism according to the first embodiment of the present disclosure is now described with reference to the drawings. In this embodiment, an electric shovel is described as a representative example of the power tool having a hammer mechanism. The electric shovel is a hand-held power tool configured to be used for digging, shoveling, scooping, or crushing soil, sand, gravel, coal, snow or the like, or other similar work. The electric shovel is configured to perform motion of linearly reciprocating a shovel as a tool accessory TT mounted to a front end, along a prescribed hammer axis TX (which motion is hereinafter also referred to as hammering motion). The shovel is intended, for example, for use in civil engineering or agriculture or for domestic use. The shovel is also referred to as a scoop. The power tool 100 having a hammer mechanism (hereinafter simply referred to as the power tool 100) can be appropriately used for other than digging work by replacing the tool accessory TT.

In this specification, for the sake of convenience of description, the extending direction of the hammer axis TX is defined as a front-rear direction of the power tool 100. In the front-rear direction, a front end surface 612 side on which a tool holder 90 (see FIG. 3) is arranged is defined as the front side of the power tool 100, and the opposite side is defined as the rear side of the power tool 100. A direction orthogonal to the hammer axis TX and a shaft axis SX (see FIG. 3) is defined as an up-down direction of the power tool 100. In the up-down direction, the direction from the shaft axis SX toward the hammer axis TX is defined as an upward direction, and the opposite direction is defined as a downward direction. A direction orthogonal to the front-rear direction and the up-down direction is defined as a left-right direction.

The power tool 100 has a housing 60 and a handle 70 connected to the housing 60. The handle 70 is configured to be held by a user. The structure of the handle 70 will be described below.

The housing 60 is an elongate hollow casing having a generally circular cylindrical shape and extending along the hammer axis TX. The housing 60 has a front end surface 612 on the front side of the housing 60, a rear surface 622 on the opposite side to the front end surface 612, and a side surface 64 between the front end surface 612 and the rear surface 622. The side surface 64 is a part, for example, of an outer surface of the housing 60 except the front end surface 612 and the rear surface 622. A battery BAT for supplying power to the motor 20 is arranged on the rear surface 622. In this disclosure, a rechargeable battery having a known structure is used as the battery BAT.

Figure 2:
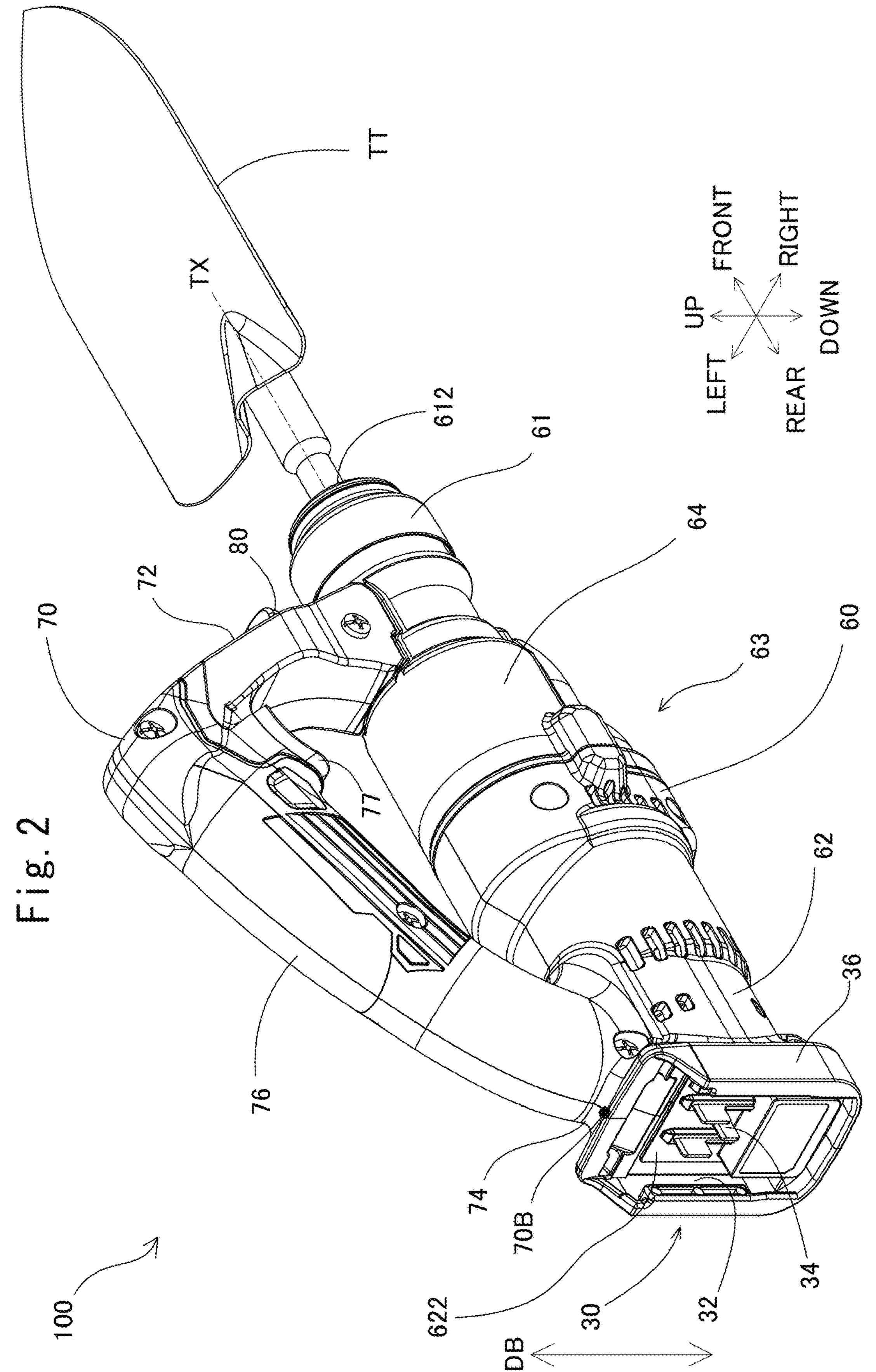
FIG. 2 shows the configuration of a battery mounting part.

FIG. 2 shows the power tool 100 in a state that the battery BAT is detached therefrom. As shown in FIG. 2, a battery mounting part 30 for mounting the battery BAT is provided on the rear surface 622 of the housing 60. The battery mounting part 30 has guide rails 32, terminals 34 and a side wall part 36. The side wall part 36 is extending rearward from right and left ends and a lower end of the rear surface 622 to form a U shape when viewed from the rear. The guide rails 32 protrude from an inner peripheral surface of left and right portions of the side wall part 36, respectively, and extend in the up-down direction. The guide rails 32 are configured to be respectively fitted in recessed rail receiving parts (not shown) of the battery BAT. The guide rails 32 define an attaching/detaching direction DB in which the battery BAT is attached and detached. The battery BAT attached on the battery mounting part 30 is electrically connected via the terminals 34 and can supply power to the motor 20. The battery mounting part 30 may further have a locking mechanism for restricting falling of the battery BAT.

Figure 3:
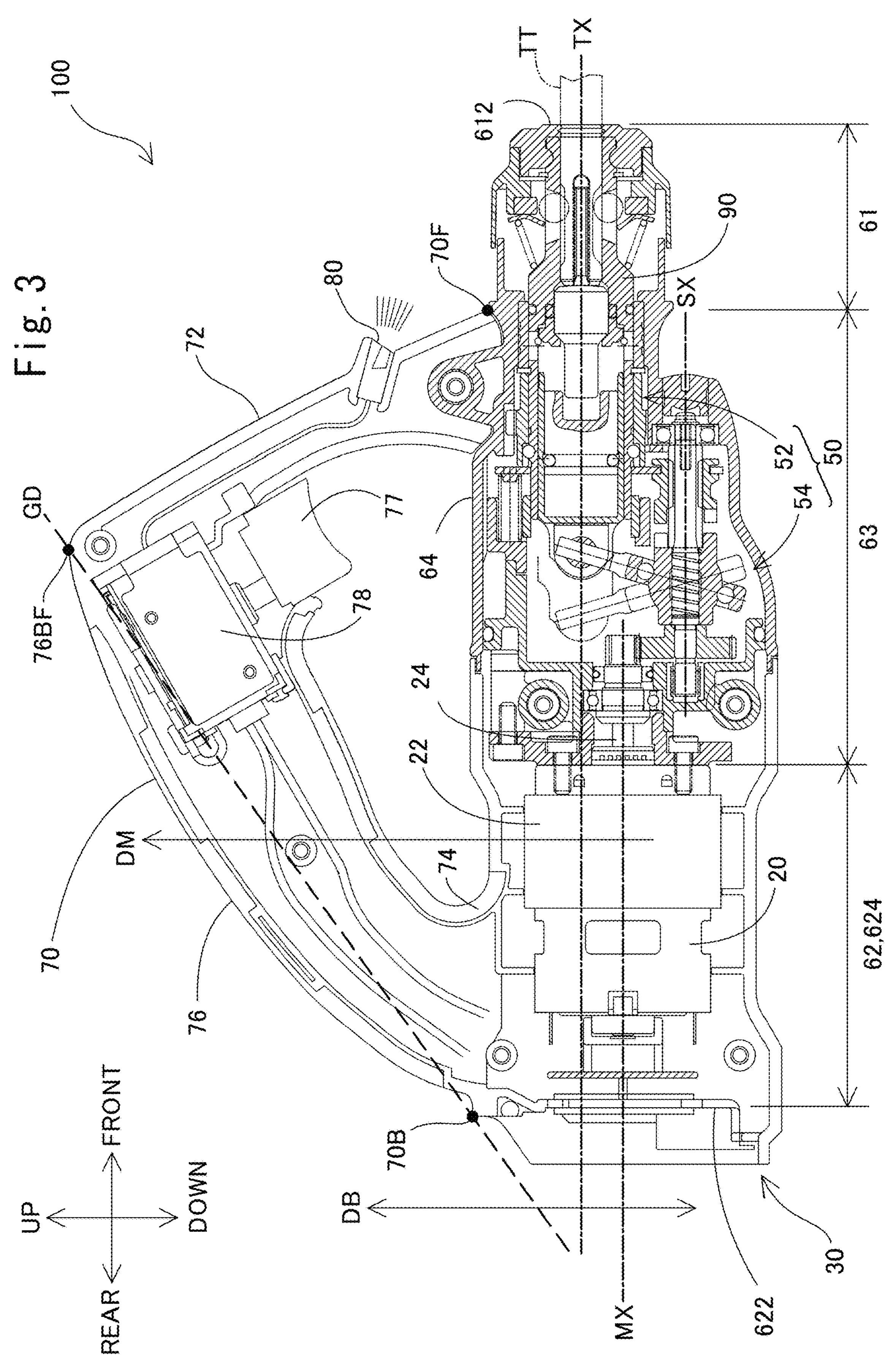
FIG. 3 is a sectional view taken along line III-III in FIG. 1.

As shown in FIG. 3, the housing 60 houses the motor 20, a hammer mechanism 50 and a tool holder 90. The tool holder 90 detachably holds the tool accessory TT in an insertion hole 92 formed in a front end part 61 of the housing 60. The tool holder 90 is housed in the front end part 61. The front end part 61 includes the front end surface 612. A part of the housing 60 in which a motor body 22 is arranged is also referred to as a motor housing part 624, and a part of the housing 60 in which the hammer mechanism 50 is arranged is also referred to as a hammer housing part 63. A part of the housing 60 that is formed on the opposite side to the front end part 61 is also referred to as a rear end part 62. The rear end part 62 includes the rear surface 622 and the motor housing part 624. In this embodiment, the motor housing part 624 and the rear end part 62 are coincident with each other.

In FIG. 3, for the sake of convenience of description, the power tool 100 is shown in the state that the battery BAT is detached. The attaching/detaching direction DB of the battery BAT to the battery mounting part 30 is a direction crossing the hammer axis TX and passing through the handle 70. The "direction crossing the hammer axis TX and passing through the handle 70" includes (i) a direction that crosses the hammer axis TX and crosses a straight line GD that extends in an extending direction of a grip part 76 (described below), and (ii) a direction DM orthogonal to the hammer axis TX and passing through the handle 70 and the hammer mechanism 50. In an example shown in FIG. 3, the attaching/detaching direction DB coincides with the up-down direction.

For example, a user can detach the battery BAT from the battery mounting part 30 by sliding and pulling out the battery BAT upward to the handle 70 side. Further, the user can attach the battery BAT to the battery mounting part 30 by sliding the battery BAT downward along the guide rails 32. The attaching/detaching direction DB of the battery BAT is parallel to the up-down direction, so that the user can easily attach and detach the battery BAT by one hand, while holding the handle 70 by the other hand.

The structures of elements disposed within the housing 60 are now described with reference to FIGS. 3 to 6. As shown in FIG. 3, the motor housing part 624 of the housing 60 is at the rear end part 62 of the housing 60. The motor 20 is driven by power supplied from the battery BAT attached to the battery mounting part 30. In this embodiment, the motor 20 is, for example, a brushed DC motor. The power tool 100 of this embodiment is not provided with a controller for driving control of the motor 20, so that the housing 60 is reduced in size. As shown in FIG. 3, the motor 20 is arranged in such a position that the hammer axis TX passes through the motor 20. Thus, a motor axis MX of the motor 20 that is a driving source of hammering motion is arranged relatively close to the hammer axis TX of the tool accessory TT, so that the power tool 100 can be reduced in size in a radial direction.

As shown in FIG. 3, the motor 20 has a motor body 22 including a stator and a rotor, and a motor shaft 24. The stator of the motor body 22 is fixed to the motor housing part 624 of the rear end part 62. The motor shaft 24 rotates around the motor axis MX together with the rotor. The motor axis MX is arranged parallel to the hammer axis TX below the hammer axis TX. A front end of the motor shaft 24 protrudes into the hammer housing part 63. A pinion gear 541 is provided on the front end of the motor shaft 24. A fan for cooling the motor body 22 may be provided on the motor shaft 24.

Figure 4:
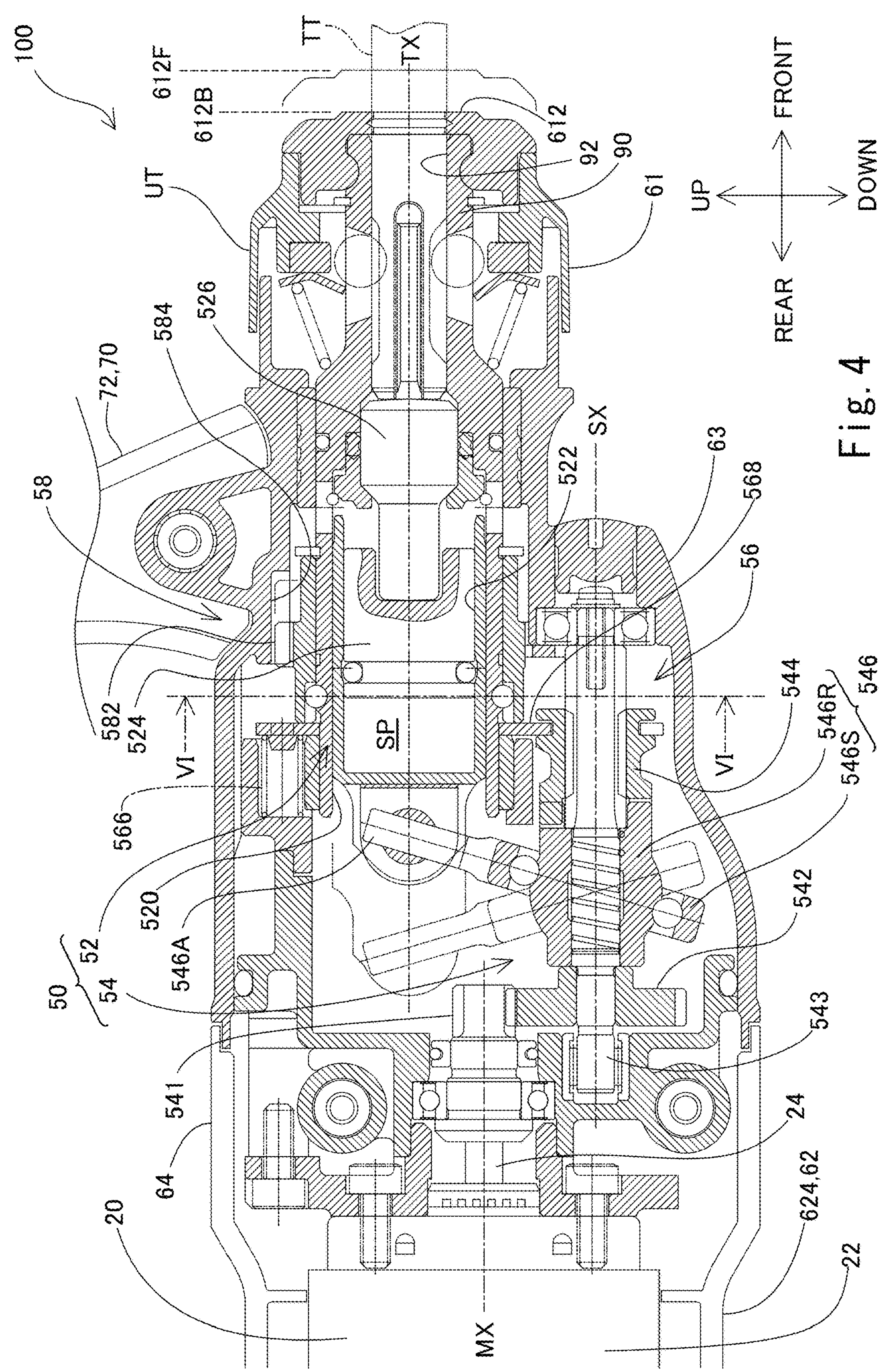
FIG. 4 shows the configuration of a hammer mechanism.

The hammer mechanism 50 is now described in detail with reference to FIGS. 4 to 6. As shown in FIG. 4, the hammer mechanism 50 includes a hammer (striking) part 52 and a motion converting part 54. The motion converting part 54 is configured to transmit the kinetic energy of rotary motion of the motor shaft 24 to a hammer (striking) element 524 and to convert the rotary motion of the motor shaft 24 into linear motion of the hammer element 524 along the hammer axis TX. The hammer part 52 transmits the kinetic energy of the hammer element 524 to the tool accessory TT.

The motion converting part 54 includes the pinion gear 541, an intermediate gear 542, an intermediate shaft 543, a transmitting member 544 and a motion converting member 546. The pinion gear 541 is provided on the front end of the motor shaft 24 protruding into the hammer housing part 63. The intermediate gear 542 is engaged with the pinion gear 541. The intermediate gear 542 is fixed to a rear end part of the intermediate shaft 543. Thus, the rotary motion of the motor shaft 24 is transmitted to the intermediate shaft 543 via the pinion gear 541 and the intermediate gear 542 that are engaged with each other.

The intermediate shaft 543 transmits the kinetic energy from the motor 20 to the transmitting member 544. The intermediate shaft 543 is supported by two bearings so as to be rotatable around the shaft axis SX. The shaft axis SX is arranged parallel to the hammer axis TX and the motor axis MX below the motor axis MX. These three axes are arranged parallel to each other and displaced from each other in the up-down direction, so that the power tool 100 can be reduced in size in the axial direction or the front-rear direction of the power tool 100.

The transmitting member 544 transmits rotary motion of the intermediate shaft 543 to a rotary body 546R of the motion converting member 546. The transmitting member 544 is connected to the intermediate shaft 543 and rotates around the shaft axis SX together with the intermediate shaft 543. The transmitting member 544 has a transmitting member engagement part 562 that can be engaged with a converting member engagement part 564 of the motion converting member 546 as described below.

The motion converting member 546 is arranged on the intermediate shaft 543 and configured to convert rotary motion of the intermediate shaft 543 into linear motion and transmit it to the hammer element 524. The motion converting member 546 includes the rotary body 546R and an oscillating member 546S. The rotary body 546R is loosely fitted onto the intermediate shaft 543 and supported to be rotatable relative to the intermediate shaft 543. The rotary body 546R has the converting member engagement part 564. Rotary motion of the intermediate shaft 543 is transmitted to the rotary body 546R of the motion converting member 546 via the transmitting member 544 when the converting member engagement part 564 is engaged with the transmitting member engagement part 562 of the transmitting member 544.

The oscillating member 546S is fitted onto the rotary body 546R so as to be rotatable relative to the rotary body 546R. The oscillating member 546S has an arm part 546A extending upward from the rotary body 546R. The oscillating member 546S oscillates in the front-rear direction or the extending direction of the shaft axis SX along with rotation of the rotary body 546R. The arm part 546A transmits oscillation of the oscillating member 546S to a piston 522.

The hammer part 52 includes the piston 522, the hammer element 524 and an impact bolt 526. The piston 522 is a bottomed cylindrical member. The piston 522 is arranged within a cylinder 520 so as to be slidable along the hammer axis TX. The piston 522 is connected to the arm part 546A of the oscillating member 546S via a connecting pin and configured to reciprocate in the front-rear direction along with oscillation of the oscillating member 546S.

The hammer element 524 applies a hammering (striking) force to the tool accessory TT. The hammer element 524 is arranged within the piston 522 so to be slidable along the hammer axis TX. An air chamber SP that functions as an air spring is defined between the bottom of the piston 522 and the hammer element 524 within the piston 522. The impact bolt 526 is an intermediate element that transmits the kinetic energy of the hammer element 524 to the tool accessory TT. The impact bolt 526 is arranged in front of the hammer element 524 so as to be movable along the hammer axis TX.

When the piston 522 is moved in the front-rear direction along with oscillation of the oscillating member 546S, the pressure within the air chamber SP fluctuates and the hammer element 524 is slid in the front-rear direction within the cylinder 520 by the action of the air spring. More specifically, when the piston 522 is moved forward, the distance between the piston 522 and the hammer element 524 decreases, so that air within the air chamber SP is compressed and the pressure within the cylinder 520 increases. The hammer element 524 is pushed forward at high speed and hammers (strikes, hits) the impact bolt 526 by the action of the air spring. The hammered impact bolt 526 transmits the kinetic energy of the hammer element 524 to the tool accessory TT. The tool accessory TT is then linearly driven along the hammer axis TX. In the power tool 100 of this embodiment, utilizing the action of the air spring, vibration of the power tool 100 is reduced and larger kinetic energy is transmitted to the tool accessory TT, compared with a power tool in which the kinetic energy is mechanically transmitted to the tool accessory TT.

When the piston 522 is moved rearward, the distance between the piston 522 and the hammer element 524 increases, so that air within the air chamber SP is expanded. Thus, the pressure within the cylinder 520 decreases and the hammer element 524 is retracted rearward. The hammered tool accessory TT comes into contact with a work object and moved rearward together with the impact bolt 526 by a reaction force from the work object. Similar hammering motion of the hammer mechanism 50 is repeated.

Figure 5:
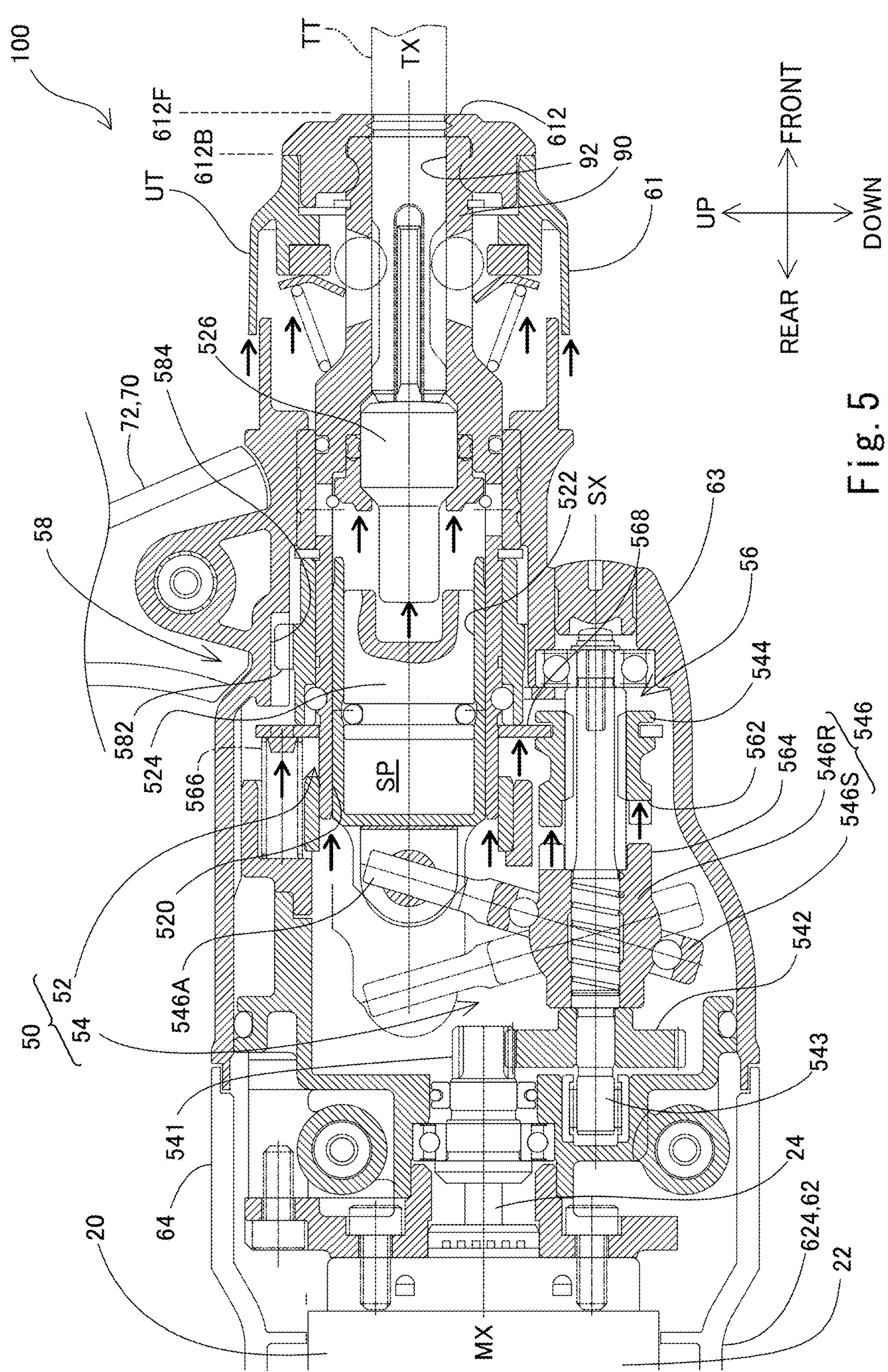
FIG. 5 shows the configuration of an idle hammering prevention mechanism.

As shown in FIGS. 4 and 5, the power tool 100 of this embodiment has an idle hammering prevention mechanism 56. In hammering motion, for example, where the tool accessory TT is not pressed against a work object, or no load is applied to tool accessory TT, it is preferable that the hammer element 524 does not hammer the impact bolt 526. In the unloaded state, the idle hammering prevention mechanism 56 stops the hammer element 524 hammering the impact bolt 526.

The idle hammering prevention mechanism 56 includes the transmitting member engagement part 562, the converting member engagement part 564, a biasing member 566 and a connecting part 568. The biasing member 566 is an elastic element such as a compression spring. The biasing member 566 biases forward a hammer unit UT that is formed by integrally connecting the front end part 61 including the tool holder 90, and the impact bolt 526 and the cylinder 520. The connecting part 568 connects the hammer unit UT and the transmitting member 544. The hammer unit UT and the transmitting member 544 are configured to be made integrally slidable in the front-rear direction by the connecting part 568.

FIG. 4 shows the idle hammering prevention mechanism 56 with the converting member engagement part 564 engaged with the transmitting member engagement part 562. In a loaded state in which the tool accessory TT is pressed against a work object with a larger force than the biasing force of the biasing member 566, the hammer unit UT and the transmitting member 544 are pushed rearward. Thus, the converting member engagement part 564 is engaged with the transmitting member engagement part 562, and the idle hammering prevention mechanism 56 is switched to the engaged state.

FIG. 5 shows the idle hammering prevention mechanism 56 in a disengaged state. In the unloaded state in which the biasing force of the biasing member 566 is larger than the force of pressing the tool accessory TT, the hammer unit UT and the transmitting member 544 are biased forward by the biasing member 566. Thus, the converting member engagement part 564 is disengaged from the transmitting member engagement part 562, and the idle hammering prevention mechanism 56 is switched to the disengaged state. As a result, rotary motion of the intermediate shaft 543 is not transmitted to the motion converting member 546 and the piston 522 is not reciprocated, so that the hammer element 524 is prevented from hammering the impact bolt 526. As shown in FIGS. 4 and 5, where the position of the front end surface 612 of the housing 60 in the engaged state is defined as a front end position 612B, the position of the front end surface 612 of the housing 60 in the disengaged state is defined as a front end position 612F located forward of the front end position 612B.

Figure 6:
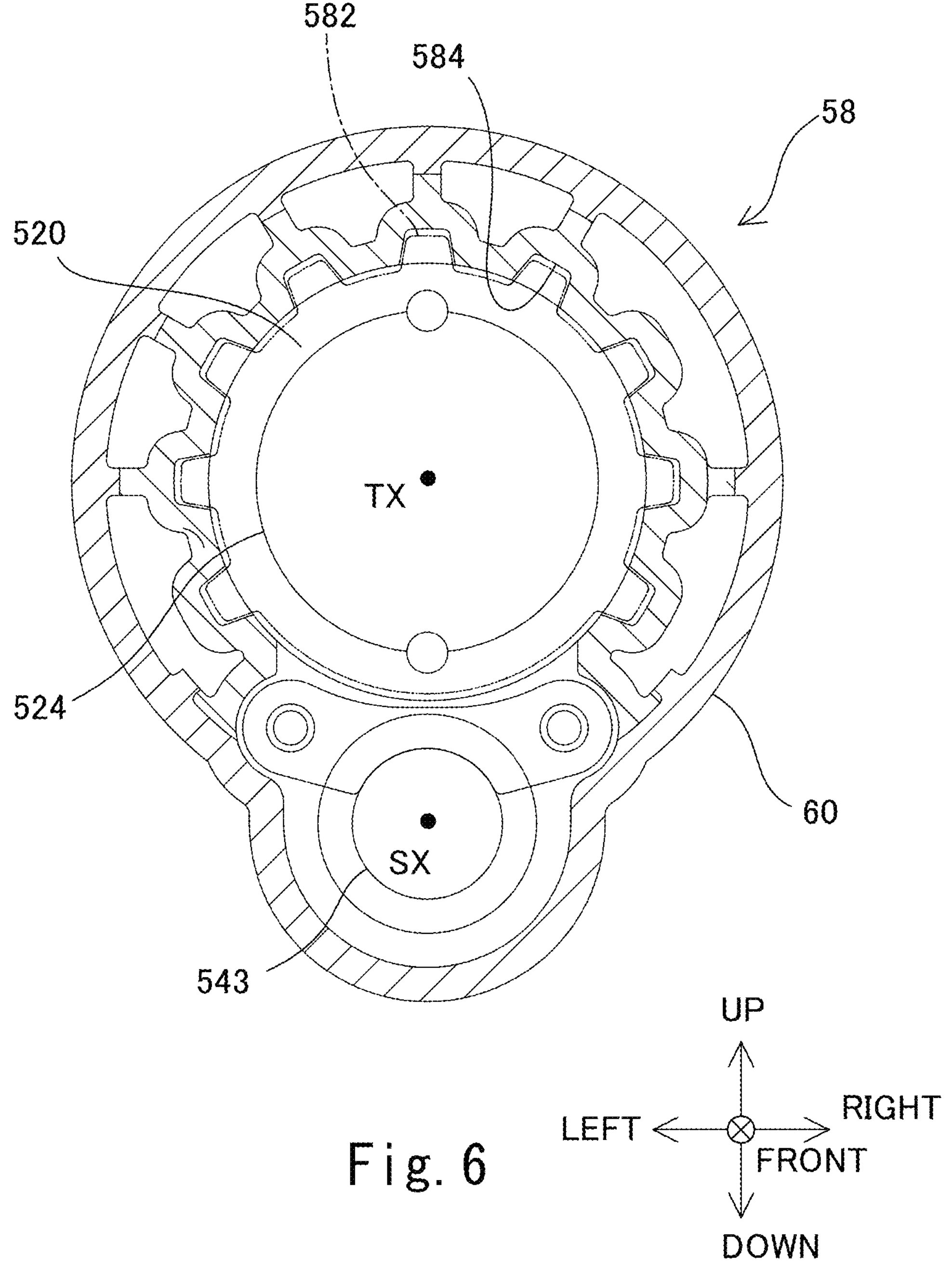
FIG. 6 is a sectional view taken along line VI-VI in FIG. 4.

As shown in FIGS. 4 and 6, the power tool 100 of this embodiment has a rotation restricting mechanism 58. A shovel as the tool accessory TT is generally used for digging work. The working efficiency of the power tool 100 may be reduced if the tool accessory TT rotates around the hammer axis TX during digging work. Thus, the rotation restricting mechanism 58 restricts the tool holder 90 and the tool accessory TT from rotating around the hammer axis TX relative to the housing 60. Provision of this structure restrains or prevents damage to the tool accessory TT by rotation of the tool accessory TT around the hammer axis TX.

The rotation restricting mechanism 58 includes rails 582 and grooves 584. Each of the rails 582 is formed on an outer periphery of the cylinder 520 and protruding outward from the cylinder 520. The rail 582 has a substantially flat plate shape elongate in the front-rear direction. Each of the grooves 584 is a recess formed in an inner peripheral surface of the housing 60 and elongate in the front-rear direction. The groove 584 has a shape conforming to the rail 582. The rails 582 are fitted in the grooves 584, respectively. The length of the groove 584 in the front-rear direction is longer than the length of the rail 582 in the front-rear direction. Thus, the rail 582 can slide in the front-rear direction within the groove 584. Further, the length of the groove 584 in the front-rear direction is longer than the distance between the above-described front end positions 612B and 612F. Provision of this configuration allows the hammer unit UT to slide in the front-rear direction between the front end positions 612B and 612F while being guided by the rail 582 and the groove 584.

As shown in FIG. 6, the cross-sectional width of the groove 584 is substantially equal to the cross-sectional width of the rail 582. This configuration restrains or prevents rotation of the hammer unit UT relative to the housing 60, and thus restrains rotation of the tool accessory TT relative to the housing 60 around the hammer axis TX. In this embodiment, as shown in FIG. 6 as an example, nine such rail parts 582 and nine such groove parts 584 are provided, but the number may be one or more each.

Figure 7:
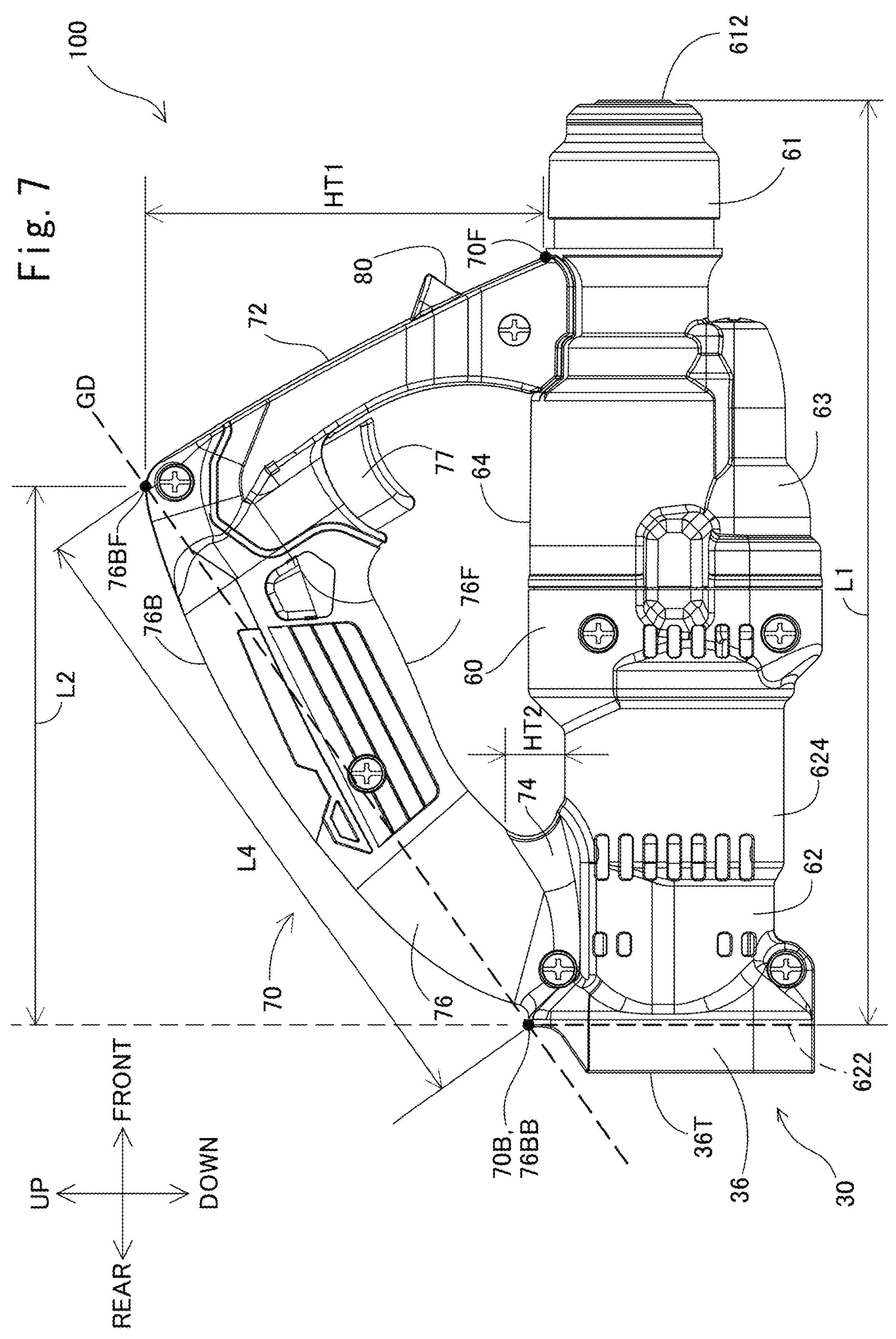
FIG. 7 shows an external appearance of a handle of the electric shovel of the first embodiment.

The structure of the handle 70 is now described with reference to FIGS. 7 and 8. As shown in FIG. 7, the handle 70 includes a rear connection part 74, a front connection part 72 and a grip part 76 that connects the rear connection part 74 and the front connection part 72.

The rear connection part 74 is a part of the handle 70 that is connected to the rear end part 62 of the housing 60. In this embodiment, a rear end 70B of the rear connection part 74 is substantially on the same plane as the rear surface 622 of the housing 60. In the example shown in FIG. 7, a rear end 70B of the handle 70 is coincident with a rear end of the housing 60, and is substantially coincident with a rear end of the motor housing part 624. In the example shown in FIG. 7, the side wall part 36 of the battery mounting part 30 is not considered as part of the housing 60, but it may be considered as part of the housing 60. In this case, for example, the rear connection part 74 is configured such that the rear end 70B is substantially on the same plane as a rear end 36T of the side wall part 36. The rear connection part 74 needs only to be connected to the rear end part 62 of the housing 60. The rear connection part 74 may be connected to the rear end part 62 between the battery mounting part 30 and the motor housing part 624, or between the rear surface 622 and the motor housing part 624. For example, the rear end 70B of the rear connection part 74 may not be on the same plane as the rear surface 622 or the rear end 36T, but may be arranged in the vicinity of the rear surface 622 or the rear end 36T.

The front connection part 72 is a part of the handle 70 that is connected to the side surface 64 of the housing 60. Specifically, the front connection part 72 is connected to a front part of the side surface 64 relative to the rear connection part 74. In the example shown in FIG. 7, the front connection part 72 is connected to the vicinity of a front end of the hammer housing part 63. Specifically, a front end 70F of the front connection part 72 is located in the vicinity of a boundary between the front end part 61 and the hammer housing part 63.

In the power tool 100 of this embodiment, the handle 70 is substantially L-shaped. The rear end of the handle 70 is arranged on the rear end part 62 of the housing 60, and a front end of the handle 70 is arranged on the front part of the side surface 64 of the housing 60. With the arrangement of the substantially L-shaped handle 70 on the upper side of the housing 60, the handle 70 and the housing 60 together form an annular external appearance. With this annular configuration, the strength of the power tool 100 is increased, and the handle 70 is easy to hold, so that the power tool 100 is provided with preferable operability for a user. Further, with the configuration in which the rear end of the handle 70 is connected to the rear end part 62 of the housing 60 and the front end of the handle 70 is connected to the vicinity of the front end part 61 of the housing 60, a user can easily keep the balance of the power tool 100 when holding the handle 70. The configuration that "the rear end of the handle 70 is arranged on the rear end part 62 of the housing 60" includes a configuration that at least one end of the handle 70 that is separately formed from the housing 60 is connected to the rear end part 62 of the housing 60, and a configuration that the handle 70 is integrally formed with the housing 60 and the rear end of the handle 70 is substantially coincident with the rear end part 62 of the housing 60.

A light emitting part 80 for emitting light is provided on the handle 70. The light emitting part 80 is, for example, an LED light unit using the battery BAT as a power source. The light emitting part 80 is configured to emit light toward the tool accessory TT, a working area including the work object or its surroundings. Provision of the light emitting part 80 can improve the visibility of the working area of the power tool 100. In this embodiment, the light emitting part 80 is provided on the front surface of the front connection part 72 of the handle 70. Thus, the power tool 100 of this embodiment can further increase the illuminance of light illuminated to the tool accessory TT or the work object and its vicinity.

The grip part 76 is an elongate member having a generally circular cylindrical shape and configured to be held by a user. As shown in FIG. 7, the grip part 76 includes a grip facing part 76F and a grip back part 76B opposite to the grip facing part 76F. The grip facing part 76F is a part of the grip part 76 facing the housing 60. In the example shown in FIG. 7, the grip facing part 76F is a group of top parts closest to the housing 60 in an outer surface of the grip part 76. The grip back part 76B is a group of top parts opposite to the grip facing part 76F in the outer surface of the grip part 76. In an embodiment in which the grip part 76 has, for example, a polygonal section and has a surface facing the housing 60, the grip facing part 76F may be defined by this facing surface, and the grip back part 76B may be defined by a surface opposite to the facing surface.

A trigger 77 is arranged in the grip facing part 76F of the grip part 76. The trigger 77 is a so-called momentary switch. A switch 78 (see FIG. 3) is turned on when the trigger 77 is depressed by a user. When the switch 78 is turned on, power is supplied from the battery BAT to the motor 20 and the motor 20 is driven.

The arrangement configuration of the handle 70 in the front-rear direction is now described with reference to FIG.

7. The grip part 76 is arranged to be inclined relative to the housing 60. One of ends of the grip part 76 that is closer to the front end surface 612 of the housing 60 is herein defined as a front end 76BF, and a shortest distance between the front end 76BF and the side surface 64 of the housing 60 is defined as a front distance HT1. The "front end 76BF of the grip part 76" can be defined by, for example, (i) a position closest to the front end surface 612 of the housing 60 in the grip back part 76B or (ii) a top point of the grip back part 76B that is located farthest from the housing 60 in the vicinity of the front connection part 72 in the grip back part 76B.

The other end of the grip part 76 that is closer to the rear surface 622 of the housing 60 is defined as a rear end 76BB, and a shortest distance between the rear end 76BB and the side surface 64 of the housing 60 is defined as a rear distance HT2. The "rear end 76BB of the grip part 76" can be defined by, for example, (i) a position closest to the rear surface 622 of the housing 60 in the grip back part 76B, or (ii) a top point that is located farthest from the housing 60 in the vicinity of the rear connection part 74 in the grip back part 76B.

As shown in FIG. 7, the front distance HT1 is longer than the rear distance HT2. In other words, a front part of the grip part 76 is more separated farther than a rear part of the grip part 76 from the housing 60. Thus, the grip part 76 is inclined relative to the housing 60 such that the grip part 76 extends away from the housing 60 as the grip part 76 extends forward. With provision of such inclined handle 70, a user can easily lift the power tool 100, and easily press the grip part 76 forward or in a direction toward the tool accessory TT. Thus, the user can easily press the tool accessory TT forward while holding the handle 70, so that the power tool 100 is provided with high workability. The "extending direction of the grip part 76" can be defined, for example, by a straight line GD passing the front end 76BF and the rear end 76BB.

In this embodiment, as shown in FIG. 7, where a length L1 is defined by the length of the housing 60 in the front-rear direction and a length L2 is defined by the length of the grip part 76 in the front-rear direction along the hammer axis TX. The length L2 is about 72% of the length L1. With such configuration that the length L2 of the grip part 76 is a half or more of the length L1 of the housing 60, a user can easily keep the balance of the power tool 100, so that the power tool 100 is provided with preferrable operability for a user. The length L1 of the housing 60 is about 230 mm, which is shorter than that of a common power tool having a hammer mechanism.

The "length L1 of the housing 60" can be defined, for example, by the shortest distance between the front end surface 612 and the rear surface 622. Alternatively, the length L1 of the housing 60 may be defined by the shortest distance between the front end surface 612 and the rear end 76BB or between the front end surface 612 and the rear end 36T of the battery mounting part 30. The "length L2 of the grip part 76 in the front-rear direction along the hammer axis TX" can be defined, for example, by the shortest distance from the rear end 76BB in the front-rear direction. Alternatively, the length L2 may be defined by the shortest distance from the rear surface 622. The length L2 is preferably set to a half or more of the length L1 from the viewpoint of improvement of the operability of the power tool 100. In this case, the length L2 may be, for example, 60% or more, 70% or more, 75% or more, 80% or more, or 90% or more, or two thirds or more of the length L1 of the housing 60.

The arrangement configuration of the handle 70 in top view is now described with reference to FIG. 8. FIG. 8 shows the power tool 100 as viewed from above. Specifically, FIG. 8 shows the power tool 100 as viewed from above in the direction DM (see FIG. 3) orthogonal to the motor axis MX and the hammer axis TX and passing through the handle 70 and the hammer mechanism 50. In the example shown in FIG. 3, the direction DM coincides with the up-down direction.

Figure 8:
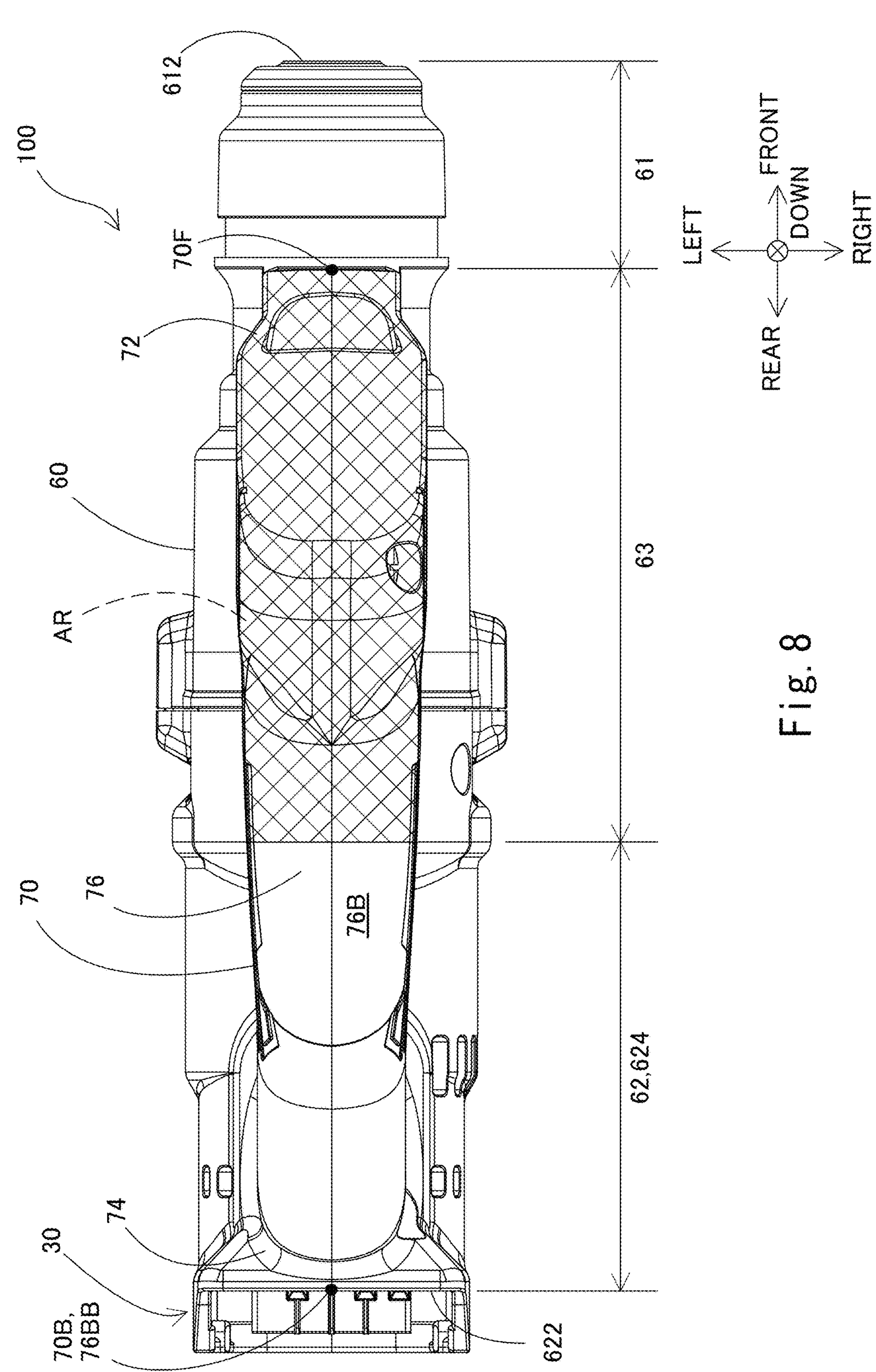
FIG. 8 is a top view of the electric shovel for showing the arrangement configuration.

In FIG. 8, an area AR in which the handle 70 and the hammer mechanism 50 overlap is shown cross-hatched. As shown in FIG. 8, in the power tool 100 of this embodiment, a part of the handle 70, specifically, a part of the grip part 76 of the handle 70 overlaps at least a part of the hammer mechanism 50. Specifically, the power tool 100 of this embodiment is configured such that the grip part 76 is arranged right (directly) above the hammer mechanism 50. With such arrangement of the handle 70 right above the hammer mechanism 50, which tends to be heavy among the elements disposed within the housing 60, a user can easily keep the balance of the power tool 100, so that the power tool 100 is provided with preferrable operability for the user.

Further, in the power tool 100 of this embodiment, the handle 70 is arranged on the opposite side to the motion converting part 54 across the hammer axis TX (see FIG. 3). The handle 70 is arranged on the upper side of the housing 60, and the motion converting part 54 is arranged in a lower part inside the housing 60, with the hammer axis TX between the motion converting part 54 and the handle 70. With the arrangement of the handle 70 in the vicinity of the hammer axis TX, the operability for a user is improved in operating the power tool 100 during hammering motion. Further, the hammer axis TX and the motion converting part 54 are arranged in a vertical direction, and the motion converting part 54, which tends to be heavy in the hammer mechanism 50, is arranged in the lower part inside the housing 60. Thus, a user can easily keep the balance of the power tool 100, so that the power tool 100 is provided with preferrable operability for the user.

As described above, according to this embodiment, the power tool 100 has the hammer mechanism 50 utilizing an air spring, and the handle 70 to be held by a user. The rear end of the handle 70 is arranged on the rear end part 62 of the housing 60. By utilizing an air spring, vibration of the power tool 100 is reduced and large kinetic energy is transmitted to the tool accessory TT, compared with a hammer mechanism that mechanically transmits the kinetic energy. Further, with the arrangement of the rear end part 62 of the handle 70 on the rear end of the housing 60, a user can easily apply a force of pressing the tool accessory TT into a work object along the hammer axis TX while holding the handle 70, so that the power tool 100 is provided in which the tool accessory TT can exert a large hammering force.

In the power tool 100 according to this embodiment, the motor housing part 624 is at the rear end part 62 of the housing 60. With the arrangement of the motor 20 at the rear end part 62 of the housing 60, the housing 60 can be reduced in size in a radial direction crossing the hammer axis TX.

In the power tool 100 according to this embodiment, the battery mounting part 30 to which the battery BAT can be removably attached is arranged on the rear surface 622 of the housing 60. With this arrangement, the housing 60 can be reduced in size in the radial direction, compared with a structure in which the battery mounting part 30 is arranged on the side surface 64 of the housing 60. Thus, the housing 60 can be easily brought close to a work object such as the ground, so that the power tool 100 is provided that is suitable for digging or other similar work.

In the power tool 100 according to this embodiment, the motor 20 is arranged such that the hammer axis TX passes through the motor 20, so that the housing 60 can be reduced in size in the radial direction.

In the power tool 100 according to this embodiment, the handle 70 is connected to the side surface 64 of the housing 60 and arranged on the opposite side to the motion converting part 54 across the hammer axis TX. With the arrangement of the handle 70 in the vicinity of the hammer axis TX, a user can easily press the tool accessory TT toward a work object in scraping/scaling or digging work. Further, with the arrangement in which the handle 70, the hammer axis TX and the motion converting part 54 are arranged in the vertical direction, and the motion converting part 54 that tends to be heavy in the hammer mechanism 50 is arranged in the lower part inside the housing 60, a user can easily keep the balance of the power tool 100, so that the power tool 100 is provided with preferrable operability for the user.

In the power tool 100 according to this embodiment, the handle 70 includes the rear connection part 74 that is connected to the rear end part 62 of the housing 60, the front connection part 72 that is connected to the side surface 64 of the housing 60, and the grip part 76 that connects the rear connection part 74 and the front connection part 72. With the annular configuration formed by the handle 70 and the housing 60, the power tool 100 is provided with preferrable operability for the user.

In the power tool 100 according to this embodiment, at least a part of the grip part 76 overlaps at least a part of the hammer mechanism 50 when the power tool 100 is viewed from above in the direction DM orthogonal to the motor axis MX and passing through the handle 70 and the hammer mechanism 50. With the arrangement of the handle 70 right above the hammer mechanism 50 that tends to be heavy, a user can easily keep the balance of the power tool 100, so that the power tool 100 is provided with preferrable operability for the user.

In the power tool 100 according to this embodiment, the grip part 76 is inclined relative to the hammer axis TX from the rear end part 62 toward the front end surface 612 in a direction away from the hammer axis TX. Thus, the power tool 100 is provided that is easy to lift and in which the tool accessory TT can be easily pressed forward by a user's operation of the handle 70.

In the power tool 100 according to this embodiment, the length L2 of the grip part 76 in the front-rear direction is a half or more of the length L1 of the housing 60 in the front-rear direction between the front end surface 612 and the rear surface 622. With the configuration in which the length L2 of the grip part 76 is approximately equal to the length L1 of the housing 60, a user can easily keep the balance of the power tool 100, so that the power tool 100 is provided with preferrable operability for the user.

In the power tool 100 of this embodiment, the battery mounting part 30 to which the battery BAT can be removably attached is arranged on the rear surface 622. The attaching/detaching direction DB of the battery BAT to/from the battery mounting part 30 is a direction orthogonal to the hammer axis TX and crossing the extending direction GD of the grip part 76. Thus, a user can easily attach and detach the battery BAT with one hand even while holding the handle 70 with the other hand.

The power tool 100 of this embodiment further has the light emitting part 80 for emitting light. The light emitting part 80 can illuminate the tool accessory TT, the work object or its surroundings, so that the visibility of the working area of the power tool 100 can be improved.

B. Second Embodiment

Figure 9:
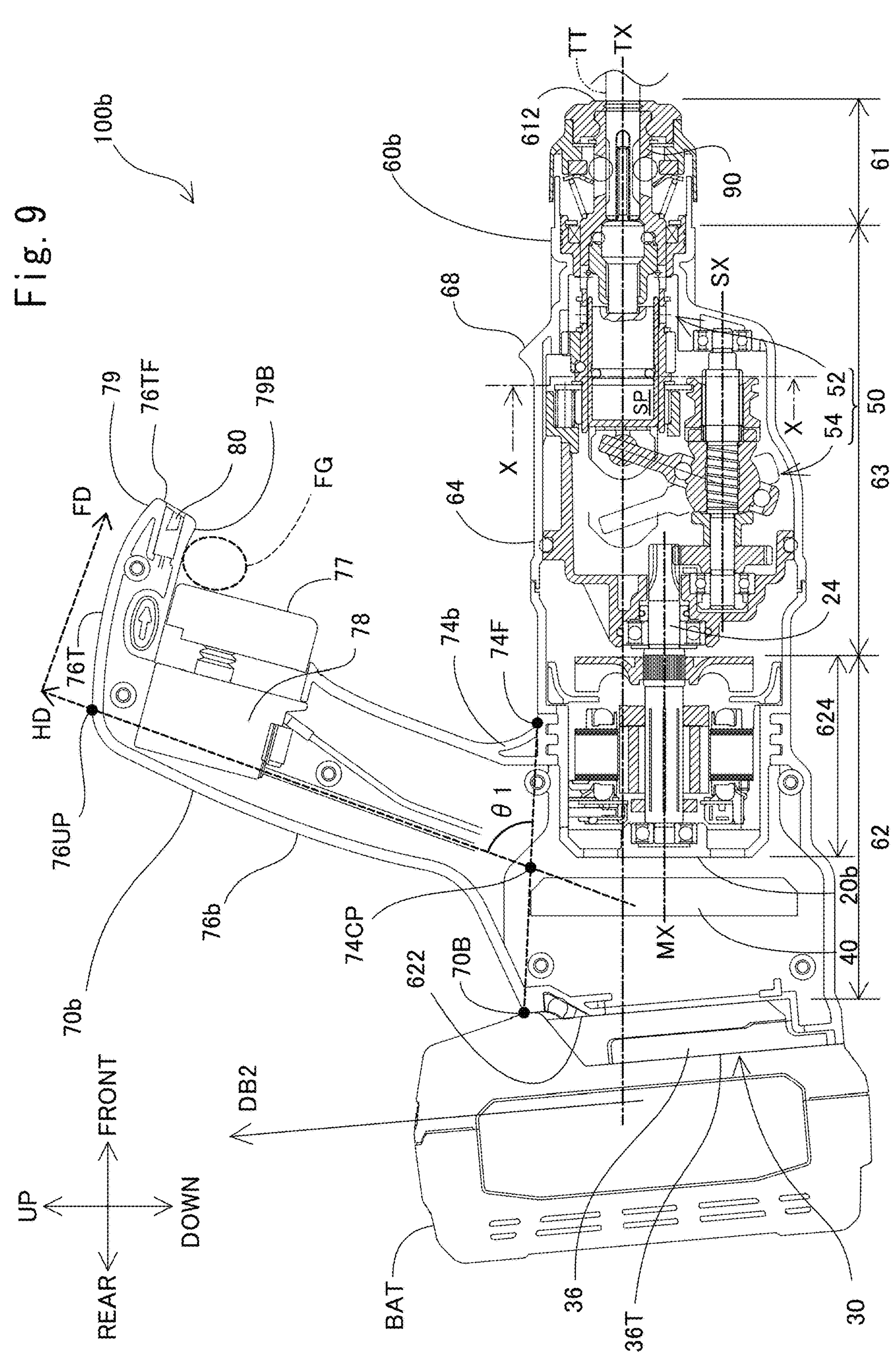
FIG. 9 shows the configuration of an electric shovel according to a second embodiment.

The structure of a power tool 100*b* having a hammer mechanism according to the second embodiment of the present disclosure is now described with reference to FIGS. 9 and 10. As shown in FIG. 9, the power tool 100*b* according to this embodiment is different from the power tool 100 of the first embodiment in that the power tool 100*b* has a housing 60*b* in place of the housing 60, a handle 70*b* in place of the handle 70, a motor 20*b* in place of the motor 20, and a controller 40. In the other points, the power tool 100*b* has substantially the same structure as the power tool 100.

The power tool 100*b* of this embodiment is used, for example, for scraping or scaling operation on a work object. For example, a scraper (not shown) may be used in place of a shovel as the tool accessory TT. The scraper is a tool used for scarping operation on a work object. The tool accessory TT may also be a so-called spatula.

The motor 20*b* is a brushless DC motor the speed of which is controlled by the controller 40. The controller 40 is formed by a computer including a CPU as a processor and memories such as a RAM and a ROM. The controller 40 is configured to control driving of the motor 20*b* and other various operations in the power tool 100. The controller 40 is arranged rearward of the motor housing part 624 in the rear end part 62. Specifically, the controller 40 is arranged between the motor housing part 624 and the rear surface 622. In other words, the controller 40 is arranged between the motor 20*b* and the battery mounting part 30 in the front-rear direction. With such arrangement, the housing 60*b* can be reduced in size in the radial direction.

The handle 70*b* has a different shape from the handle 70 of the first embodiment. In the first embodiment, the handle 70 and the housing 60 together form an annular configuration. In this embodiment, however, the handle 70*b* extends substantially linearly from the housing 60*b* in a direction away from the housing 60*b*. The handle 70*b* having a cantilever shape is also referred to as a "cantilever handle".

The handle 70*b* includes a connection part 74*b* and a grip part 76*b* connected to the connection part 74*b*. The connection part 74*b* is connected to the rear end part 62 of the housing 60*b*. Thus, like the handle 70 of the first embodiment, one end of the handle 70*b* is connected to the rear end part 62 of the housing 60*b*. In the handle 70*b*, one end of the grip part 76*b* is connected to the rear end part 62 of the housing 60*b* via the connection part 74*b*. The other end of the grip part 76*b* is a so-called free end located apart from the housing 60*b* and not connected to the housing 60*b*. The free end of the grip part 76*b* is also referred to as a "distal end 76T".

The rear end 70B of the connection part 74*b* is arranged rearward of the motor housing part 624 and rearward of the controller 40. In the example shown in FIG. 9, the rear end 70B is substantially on the same plane as the rear surface 622 of the housing 60*b*, and a rear end of the handle 70*b* is substantially coincident with a rear end of the housing 60*b*. Further, like the handle 70 of the first embodiment, the handle 70*b* is arranged on the opposite side to the motion converting part 54 across the hammer axis TX. Specifically, the handle 70*b* is connected to the side surface 64 above the motor housing part 624 and the hammer housing part 63 in the rear end part 62 of the housing 60. With the arrangement of the handle 70*b* above the hammer axis TX, a user can easily press the rear side of the handle 70*b* forward while holding the handle 70*b*. Thus, the user can easily press the tool accessory TT toward a work object in peeling or digging work.

The grip part 76*b* is an elongate member having a substantially circular cylindrical shape and configured to be held by a user. A trigger 77 having the same structure as the trigger 77 of the first embodiment is arranged on the front side of the grip part 76.

As shown in FIG. 9, an extending direction HD of the grip part 76*b* is a direction crossing the hammer axis TX and extending substantially linearly. The extending direction HD is an example of the "extending direction of the grip part 76*b*". With the configuration of the handle 70*b* extending linearly from the housing 60*b* in a direction away from the housing 60*b*, a user can easily press the rear side of the handle 70*b* forward while holding the handle 70*b*, and thus can easily press the tool accessory TT toward a work object. Therefore, the power tool 100*b* is provided that is suitable for peeling operation.

The extending direction HD can be defined, for example, by a straight line connecting a top point 76UP of the grip part 76*b* and a middle point 74CP between a front end 74F of the connection part 74*b* and the rear end 70B of the connection part 74*b*. The top point 76UP is a point on the distal end 76T where the shortest distance from the distal end 76T to the side surface 64 of the housing 60*b* is longest.

The extending direction HD is set such that a first direction component in the up-down direction orthogonal to the hammer axis TX is greater than a second direction component in the front-rear direction. Specifically, the extending direction HD is set such that an angle θ1 between the extending direction HD and the hammer axis TX is 45 degrees or more. In this embodiment, the angle θ1 is set to about 75 degrees, and the extending direction HD is slightly inclined forward relative to the up-down direction. The angle θ1 is not limited to 75 degrees, but may be set to any other angle of 45 degrees or more and less than 90 degrees, for example 45 or 60 degrees. Even with such configuration, a user can easily press the rear side of the handle 70*b* forward while holding the handle 70*b*, so that the power tool 100*b* is provided that is suitable for scraping operation. The extending direction HD need not be inclined forward relative to the up-down direction, but may be perpendicular to the housing 60*b* with the angle θ1 of 90 degrees.

The extending direction HD is not limited to that of the example that is defined by using a straight line connecting the top point 76UP and the middle point 74CP, but it may be defined by using a straight line connecting the front end 74F and the top point 76UP, or by using a straight line connecting the rear end 70B and the top point 76UP. The extending direction HD may also be defined by using a straight line connecting a middle point of the distal end 76T and any one of the front end 74F, the middle point 74CP and the rear end 70B. The middle point 74CP may be defined by using the center of a connection portion between the connection part 74*b* and the handle 70*b* or the gravity center of the connection portion.

In the power tool 100*b* of this embodiment, a protruding part 79 is formed on the distal end 76T of the grip part 76*b*. The protruding part 79 is a substantially plate-like structure protruding forward from the grip part 76*b*. A protruding direction FD of the protruding part 79 is crossing the extending direction HD and extending forward. In this embodiment, the protruding direction FD is substantially orthogonal to the extending direction HD. In the example shown in FIG. 9, a front end 76TF of the distal end 76T of the grip part 76*b* is located forward of the front end 74F of the connection part 74*b*. A light emitting part 80 is provided in the front end 76TF of the protruding part 79. This configuration can further increase the illuminance of light illuminated to the tool accessory TT, the work object and its vicinity. The protruding direction FD need not be orthogonal to the extending direction HD, but may cross the extending direction HD at any angle. Further, the light emitting part 80 may be omitted.

The protruding part 79 protrudes forward by a prescribed distance from a front surface of the trigger 77 in the protruding direction FD. Thus, the front end 76TF is located forward of the front surface of the trigger 77. When operating the power tool 100*b* while holding the grip part 76*b*, a user can put a finger FG (such as an index finger) of one hand on the trigger 700, for example, to perform ON/OFF operation of the trigger 77. The protruding part 79 is located right (directly) above the finger FG of the user in the vertical direction, so that the user can support a bottom part 79B of the protruding part 79 with the finger FG. Therefore, even having the linear handle 70*b*, the power tool 100*b* is provided with preferrable operability for a user. Further, the power tool 100*b* is easy to lift, so that the power tool 100*b* is improved in operability when digging the ground if a shovel is used as the tool accessory TT.

In another embodiment in which the power tool 100*b* has an electronic switch in place of the trigger 77, the electronic switch is preferably arranged on the distal end 76T of the grip part 76*b*. With this arrangement, a user can properly operate the electronic switch on the distal end 76T, for example, with a thumb when operating the power tool 100*b* while holding the handle 70*b*.

As shown in FIG. 9, the housing 60*b* is different from the housing 60 of the first embodiment in that the housing 60*b* has an antislip part 68. The housing 60*b* has the same internal structure as the housing 60 and houses the motor 20*b*, the hammer mechanism 50 and the tool holder 90. On the rear surface 622 of the housing 60*b*, like on the housing 60, the battery mounting part 30 for mounting the battery BAT is provided. An attaching/detaching direction DB2 of the battery BAT to/from the battery mounting part 30 is a direction crossing the hammer axis TX and inclined slightly rearward relative to the up-down direction. The attaching/detaching direction DB2 also crosses the extending direction HD of the grip part 76*b*. Specifically, the attaching/detaching direction DB2 is a direction included in a plane defined by the hammer axis TX and the extending direction HD. Thus, a user can easily attach and detach the battery BAT with one hand even while holding the handle 70*b* with the other hand. The attaching/detaching direction DB2 is included in the "direction crossing the hammer axis TX and passing through the handle 70*b*".

The antislip part 68 is provided on the side surface 64 of the housing 60*b*. More specifically, the antislip part 68 is provided forward of a center position of the housing 60*b* in the front-rear direction and forward of a center position of the hammer housing part 63 in the front-rear direction, on the side surface 64 of the housing 60*b*. The antislip part 68 is a projection protruding outward from the side surface 64.

Figure 10:
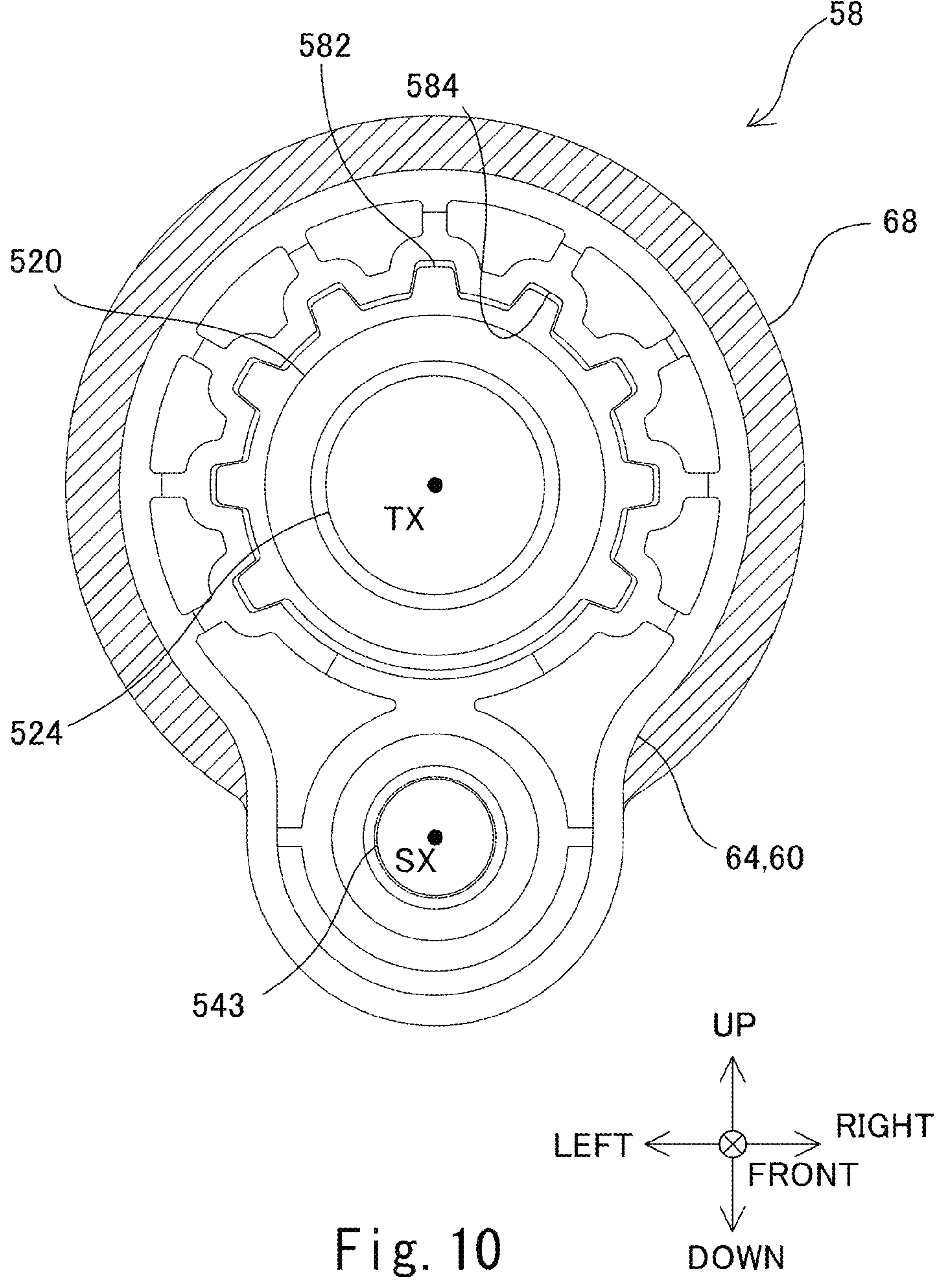
FIG. 10 is a sectional view taken along line X-X in FIG. 9.

As shown in FIG. 10, the antislip part 68 has a generally annular shape, centering on the hammer axis TX and formed continuously around the side surface 64. In FIG. 10, for clarity, the antislip part 68 is shown hatched. The antislip part 68 is integrally formed with the housing 60*b*, for example, by molding using synthetic resin or polymeric material. The antislip part 68 is not limited to this, but may be formed by an elastic member or other similar members being separately formed from the housing 60*b* and mounted on the side surface 64.

In the power tool 100*b* of this embodiment, the handle 70*b* has a linear shape, and one end of the handle 70*b* is not connected to a front part of the housing 60*b*. Thus, a user can easily hold the front part of the side surface 64 of the housing 60*b* with the other hand, and thus can hold and operate the power tool 100*b* with both hands. When operating the power tool 100*b* with both hands, the user can hold, for example, the grip part 76*b* with one hand while holding, for example, the side surface 64 of the hammer housing part 63 with the other hand. When operating the power tool 100*b* and pressing the tool accessory TT against a work object such as the ground, the user can apply a force to the handle 70*b* with one hand, while applying a forward force to the housing 60*b* with the other hand by utilizing a frictional force against the side surface 64.

In the power tool 100*b* of this embodiment, by provision of the antislip part 68 on the front part of the side surface 64, a user can perform the pressing operation with a finger of the other hand on the antislip part 68. Thus, the user can easily apply a force of pressing the power tool 100*b* forward onto the rear side of the antislip part 68, and thus can easily perform the pressing operation. Further, the user's hand is restrained or prevented from slipping further forward on the housing 60*b* when operating the power tool 100*b*. The antislip part 68 is preferably arranged in an easy-to-hold position on the side surface 64.

As described above, in the power tool 100*b* according to this embodiment, the handle 70*b* is connected to the side surface 64 of the housing 60*b* and arranged on the opposite side to the motion converting part 54 across the hammer axis TX. With the arrangement of the handle 70*b* in the vicinity of the hammer axis TX, a user can easily press the tool accessory TT toward a work object in peeling or digging work. Further, with the arrangement in which the handle 70*b*, the hammer axis TX and the motion converting part 54 are aligned in the vertical direction, and the motion converting part 54 that tends to be heavy in the hammer mechanism 50 is arranged in the lower part inside the housing 60*b*, a user can easily keep the balance of the power tool 100*b*, so that the power tool 100*b* is provided with preferrable operability for the user.

In the power tool 100*b* according to this embodiment, the handle 70*b* includes the connection part 74*b* that connects one end of the handle 70*b* to the rear end part 62, and the grip part 76*b* that extends linearly from the connection part 74*b* in the extending direction HD crossing the hammer axis TX. With the configuration of the handle 70*b* extending linearly from the housing 60*b* in a direction away from the housing 60*b*, a user can easily press the handle 70*b* from the rear side while holding the handle 70*b*, and thus can easily press the tool accessory TT forward toward a work object. Therefore, the user can easily press the power tool 100*b* against the work object, so that the power tool 100*b* is provided with high workability.

In the power tool 100*b* according to this embodiment, the grip part 76*b* has the protruding part 79 protruding from the grip part 76*b* in the protruding direction FD crossing the extending direction HD. A user can support the protruding part 79 with the finger FG while holding the grip part 76*b*. Therefore, the power tool 100*b* is provided with preferrable operability for the user, while having the linear handle 70*b*.

C. Third Embodiment

Figure 11:
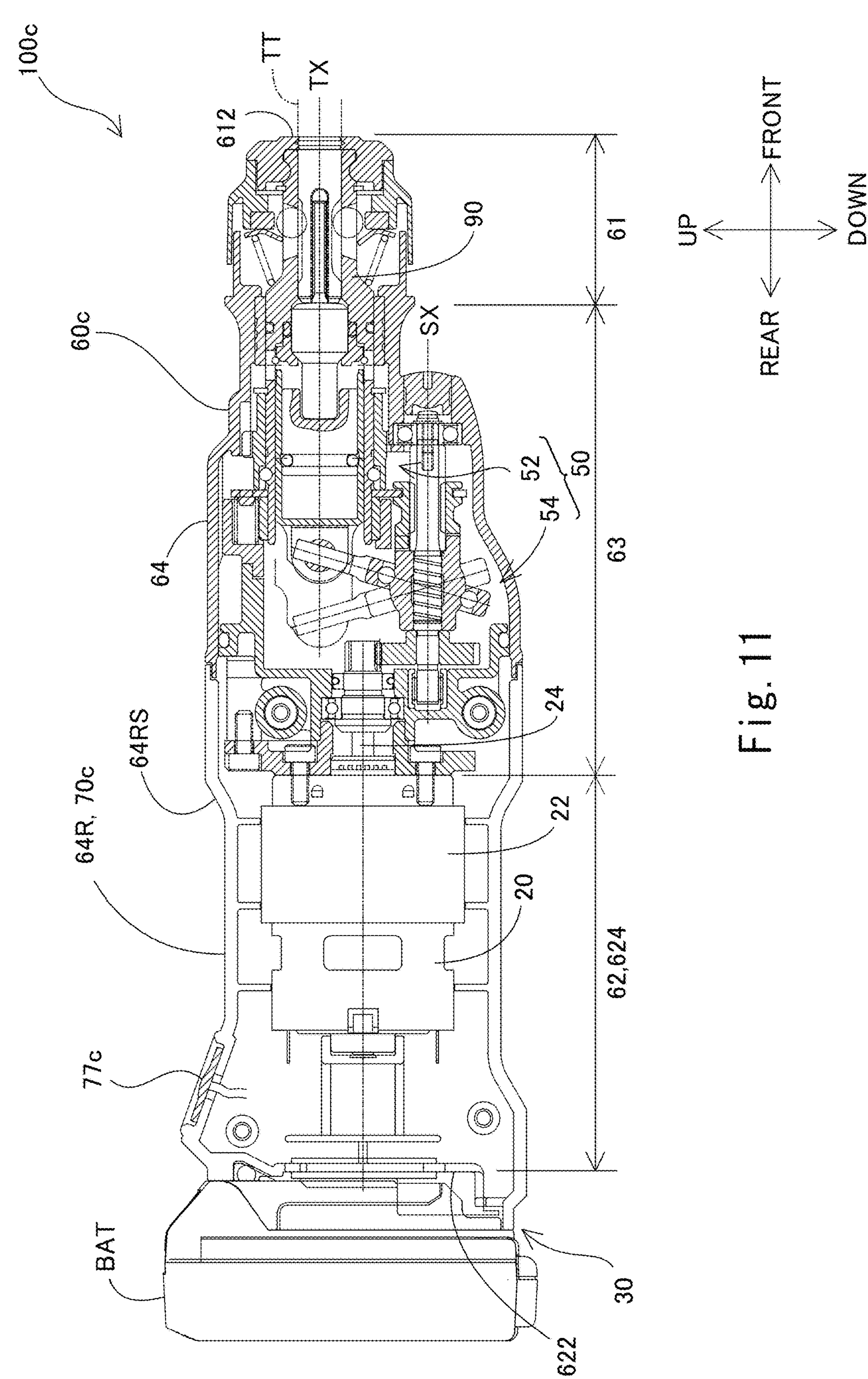
FIG. 11 shows the configuration of an electric shovel according to a third embodiment.

The structure of a power tool 100*c* having a hammer mechanism according to the third embodiment of the present disclosure is now described with reference to FIG. 11. As shown in FIG. 11, the power tool 100*c* according to this embodiment is different from the power tool 100 of the first embodiment in that the power tool 100*c* has a housing 60*c* in place of the housing 60, a handle 70*c* in place of the handle 70, and a switch 77*c* in place of the trigger 77. In the other points, the power tool 100*c* has substantially the same structure as the power tool 100. The tool accessory TT is a shovel having the same structure as that of the first embodiment.

The switch 77*c* is a push button to be manually operated to turn on and off the power supply to the motor 20. The switch 77*c* is arranged on the side surface 64 of the housing 60*c*. In this embodiment, the switch 77*c* is arranged in the vicinity of the handle 70*c* on the rear end part 62 of the side surface 64. With the arrangement of the switch 77*c* in the vicinity of the handle 70*c*, a user can easily operate the switch 77*c* while holding the handle 70*c*. The switch 77*c* may be of any type. For example, the switch 77*c* may be a push button of momentary type or alternate type, or an electrostatic switch or a membrane switch.

The housing 60*c* is different from the housing 60 in that the housing 60*c* has a recessed part 64R. The recessed part 64R has a smaller sectional area than the other part of the housing 60*c*. In this embodiment, an entirety of the recessed part 64R formed in the side surface 64 of the housing 60*c* functions as the handle 70*c*. Thus, in the power tool 100*c* of this embodiment, the handle 70*c* is integrally formed with the housing 60*c* without protruding from the housing 60*c*. A front end surface 64RS of the recessed part 64R is inclined such that a user can easily place a finger on the recessed part 64R when holding the handle 70*c*. Thus, the user's hand is restrained or prevented from slipping further forward on the housing 60*c* when operating the power tool 100*c*. The recessed part 64R preferably has a sectional width easy to hold.

The recessed part 64R is formed in the rear end part 62 of the housing 60*c*. Thus, in the power tool 100*c* of this embodiment, a rear end of the handle 70*c* is also located in the rear end part 62 of the housing 60*c*. Therefore, a user can easily press the tool accessory TT into a work object while holding the handle 70*c*, so that the power tool 100*b* is provided with high workability.

In another embodiment in which the housing 60*c* does not have the recessed part 64R, any position of the housing 60*c* other than the front end part 61 may function as the handle 70*c*, provided that a user can hold the housing 60*c*. In this case, the rear end of the handle 70*c* is arranged on the rear end part 62 of the housing 60*c*, and is coincident with the rear end of the housing 60*c*. Further, a front end of the handle 70*c* is arranged on the front end part 61 of the housing 60*c*, and is coincident with the front end of the housing 60*c*. The user operates the power tool 100*c*, while holding, for example, any position of the housing 60*c* with both or one hand.

D. Other Embodiments (D1) In the above-described embodiments, the power tools 100, 100*b* having a shovel as the tool accessory TT are described as examples, but the tool accessory TT may be a tool other than a shovel. The shovel may or may not have a part on which a user's foot can be placed.

(D2) In the above-described embodiments, the motion converting member 546 is described as an example that includes the rotary body 546R and the oscillating member 546S, but the motion converting member 546 may be formed by using a so-called crank mechanism. The motion converting member 546 having a crank mechanism has, for example, a crank shaft and a connecting rod. The crank shaft is rotated, for example, around a rotational axis perpendicular to the motor axis MX, by rotation of the pinion gear 541 of the motor shaft 24. The connecting rod connects the piston 522 and a crank pin provided on the crank shaft. When the motor 20 is driven and the motor shaft 24 rotates, the crank shaft rotates and the crank pin rotates around the rotational axis of the crank shaft. The piston 522 reciprocates in the front-rear direction via the connecting rod that is oscillated by rotation of the crank pin. The power tool 100 having such a structure also has the same effects as the above-described embodiments.

(D3) In view of the nature of the present disclosure and the above-described embodiments, the following aspects are provided. The aspects can be employed in combination with the power tools 100, 100*b*, 100*c* of the above-described embodiments, the above-described modifications or the claimed invention.

(Aspect 1) The rear end of the handle is on the same plane as the rear surface of the housing.

(Aspect 2) The rear end of the handle is coincident with an end of the housing.

(Aspect 3) The rear end of the handle is formed continuously to the rear surface of the housing.

(Aspect 4) The rear end of the handle is connected to at least a part of the battery mounting part.

(Aspect 5) A front end of the handle is connected to a vicinity of the front end part of the housing.

(Aspect 6) The power tool has an antislip part on a side surface of the housing and protruding outward from the side surface.

(Aspect 7) The antislip part is arranged in a vicinity of the front end part of the housing.

(Aspect 8) The light emitting part is arranged in the front connection part of the housing.

(Aspect 9) An angle between the extending direction and the hammer axis is 45 degrees or more and less than 90 degrees.

(Aspect 10) The handle is integrally formed with the housing.

DESCRIPTION OF THE REFERENCE NUMERALS

20, 20*b*: motor, 22: motor body, 24: motor shaft, 30: battery mounting part, 32: guide rail, 34: terminal, 36: side wall part, 36T: top, 40: controller, 50: hammer mechanism, 52: hammer part, 54: motion converting part, 56: idle hammering prevention mechanism, 58: rotation restricting mechanism, 60, 60*b*, 60*c*: housing, 61: front end part, 62: rear end part, 63: hammer housing part, 64: side surface, 64R: recessed part, 68: antislip part, 70, 70*b*, 70*c*: handle, 70B: rear end, 70F: front end, 72: front connection part, 74: rear connection part, 74CP: middle point, 74F: front end, 74*b*: connection part, 76: grip part, 76B: grip back part, 76BB: rear end, 76BF: front end, 76F: grip facing part, 76T: distal end, 76TF: front end, 76UP: top point, 76*b*: grip part, 77: trigger, 77*c*: switch, 78: switch, 79: protruding part, 79B: bottom part, 80: light emitting part, 90: tool holder, 92: insertion hole, 100, 100*b*, 100*c*: power tool having a hammer mechanism, 520: cylinder, 522: piston, 524: hammer element, 526: impact bolt, 541: pinion gear, 542: intermediate gear, 543: intermediate shaft, 544: transmitting member, 546: motion converting member, 546A: arm part, 546R: rotary body, 546S: oscillating member, 562: transmitting member engagement part, 564: converting member engagement part, 566: biasing member, 568: connecting part, 582: rail, 584: groove, 612: front end surface, 612B: front end position, 612F: front end position, 622: rear surface, 624: motor housing part, BAT: battery, DB, DB2: mounting direction, FD: protruding direction, FG: finger, GD: straight line, HD: extending direction, MX: motor axis, SP: air chamber, SX: shaft axis, TT: tool accessory, TX: hammer axis, UT: hammer unit

The invention claimed is:

1. A power tool, comprising:

a motor having a motor shaft that rotates around a motor axis;

a hammer mechanism that includes a cylinder and a hammer element adjacent to an air chamber defined within the cylinder and converts rotary motion of the motor shaft to linear motion of the hammer element along a hammer axis by utilizing action of an air spring of the air chamber;

a housing that (i) has a front-end part including a front-end surface and to which a tool accessory is mounted, and a rear-end part including a rear surface on the opposite side to the front-end surface, and (ii) houses the motor and the hammer mechanism; and a handle that is configured to be held by a user, wherein:

the motor axis and the hammer axis are parallel to each other, a rearmost part of the handle is arranged on the rear-end part of the housing, and the rearmost part of the handle is formed continuously to the rear surface of the housing.

2. The power tool as defined in claim 1, wherein the rear-end part of the housing includes a motor housing that houses the motor.

3. The power tool as defined in claim 1, further comprising a battery mounting part configured such that a battery for supplying power to the motor is removably attached thereto, wherein:

the hammer axis passes through the battery mounting part.

4. The power tool as defined in claim 1, wherein the hammer axis passes through the motor.

5. The power tool as defined in claim 1, wherein:

the hammer mechanism includes a motion converting part that converts rotary motion of the motor shaft into linear motion of the hammer element, and the handle is connected to a side surface of the housing, and arranged on the opposite side to the motion converting part across the hammer axis.

6. The power tool as defined in claim 5, further comprising:

a battery mounting part that is provided on the rear-end part of the housing and configured such that a battery for supplying power to the motor is removably attachable thereto, wherein:

an attaching/detaching direction of the battery to/from the battery mounting part crosses the hammer axis and passes through the handle.

7. The power tool as defined in claim 1, wherein at least a part of the handle overlaps at least a part of the hammer mechanism, when the power tool is viewed from above in a direction orthogonal to the motor axis and passing through the handle and the hammer mechanism.

8. The power tool as defined in claim 1, wherein the handle includes (i) a rear connection part that connects the rearmost part of the handle to the rear-end part of the housing, (ii) a front connection part that connects a front end of the handle to a side surface of the housing, and (iii) a grip part that connects the rear connection part and the front connection part.

9. The power tool as defined in claim 8, wherein the grip part is inclined relative to the hammer axis from the rear-end part toward the front-end surface in a direction away from the hammer axis.

10. The power tool as defined in claim 8, wherein the length of the grip part along the hammer axis is a half or more of the length of the housing between the front-end surface and the rear surface.

11. The power tool as defined in claim 1, wherein:

the handle includes a connection part that connects the rearmost part of the handle to the rear-end part of the housing, and a grip part that extends from the connection part in an extending direction crossing the hammer axis, the extending direction has a first direction component in a direction orthogonal to the hammer axis and a second direction component in a direction along the hammer axis, and the first direction component is greater than the second direction component.

12. The power tool as defined in claim 11, wherein:

a front end of the handle is spaced apart from the housing, and the grip part has a protruding part protruding from the grip part in a protruding direction crossing the extending direction.

13. The power tool as defined in claim 11, wherein an angle between the extending direction and the hammer axis is 45 degrees or more and less than 90 degrees.

14. The power tool as defined in claim 11, further comprising:

an antislip part on a side surface of the housing, wherein the antislip part is protruding outward from the side surface.

15. The power tool as defined in claim 14, wherein the antislip part is arranged in the front-end part of the housing.

16. The power tool as defined in claim 1, further comprising a light emitting part that is configured to emit light toward a working area.

17. The power tool as defined in claim 1, wherein the rearmost part of the handle is on a same plane as the rear surface of the housing.

18. The power tool as defined in claim 1, wherein a top point of the handle is positioned forward of a frontmost part of a rear connection part that connects the rearmost part of the handle to the rear-end part of the housing.

19. A power tool, comprising:

a motor having a motor shaft that rotates around a motor axis;

a hammer mechanism that includes a cylinder and a hammer element adjacent to an air chamber defined within the cylinder and converts rotary motion of the motor shaft to linear motion of the hammer element along a hammer axis by utilizing action of an air spring of the air chamber;

a housing that (i) has a front-end part including a front-end surface and to which a tool accessory is mounted, and a rear-end part including a rear surface on the opposite side to the front-end surface, and (ii) houses the motor and the hammer mechanism; and a handle that is configured to be held by a user, wherein:

the motor axis and the hammer axis are parallel to each other, a rearmost part of the handle is arranged on the rear-end part of the housing, and the rearmost part of the handle is connected to at least part of a battery mounting part that is provided on the rear-end part of the housing and configured such that a battery for supplying power to the motor is removably attachable thereto.

20. The power tool as defined in claim 19, wherein an outer periphery of a motor housing that houses the motor functions as the handle.

* * * * *